United States Patent
Lanigan, Sr. et al.

(10) Patent No.: US 9,969,318 B2
(45) Date of Patent: May 15, 2018

(54) LOCKING SYSTEM FOR SECURING A CONTAINER

(71) Applicant: Mi-Jack Products, Inc., Hazel Crest, IL (US)

(72) Inventors: John J. Lanigan, Sr., Orland Park, IL (US); Martin C. Conneally, Downers Grove, IL (US); Antonio Carlos Callado Souza, Chicago, IL (US); Jason Schmidt, Flossmoor, IL (US); Kevin Gerald Muszynski, Lockport, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 1 day.

(21) Appl. No.: 15/140,003

(22) Filed: Apr. 27, 2016

(65) Prior Publication Data

US 2017/0313231 A1    Nov. 2, 2017

(51) Int. Cl.
  *B60P 7/08*   (2006.01)
  *B60P 7/13*   (2006.01)

(52) U.S. Cl.
  CPC .......... *B60P 7/0807* (2013.01); *B60P 7/132* (2013.01)

(58) Field of Classification Search
  CPC ............... B60P 7/0807; B60P 7/132
  USPC ........... 410/69, 73, 76, 78, 82, 83; 24/287
  See application file for complete search history.

(56) References Cited

U.S. PATENT DOCUMENTS

| | | | |
|---|---|---|---|
| 1,303,854 A * | 5/1919 | Clark | B60P 1/6427 410/80 |
| 2,424,429 A | 7/1947 | Bamberg | |
| 3,087,741 A * | 4/1963 | De Lay | B62D 53/068 |
| 3,158,106 A | 11/1964 | Clejan | |
| 3,399,921 A | 9/1968 | Trost et al. | |
| 3,614,153 A | 10/1971 | Tantlinger et al. | |
| 3,719,385 A | 3/1973 | Carr | |
| 4,047,748 A | 9/1977 | Whaley et al. | |
| 4,212,251 A | 7/1980 | DiMartino | |
| 4,236,858 A | 12/1980 | Hoese et al. | |
| 4,266,820 A | 5/1981 | Whaley et al. | |

(Continued)

FOREIGN PATENT DOCUMENTS

| EP | 1243466 A2 | 9/2002 |
|---|---|---|
| EP | 2308719 A1 | 4/2011 |

(Continued)

OTHER PUBLICATIONS

International Search Report and Written Opinion dated May 6, 2015, for International Application No. PCT/US2015/013543, Applicant, Mi-Jack Products, Inc. (12 pages).

(Continued)

*Primary Examiner* — Stephen Gordon
(74) *Attorney, Agent, or Firm* — McCracken & Gillen LLC

(57) ABSTRACT

A lock for securing a container includes a lock platform, a coupler including a portion that is disposed above the lock platform, an interaction member associated with the coupler, and a linkage mechanism including an actuation device and an actuation surface. The actuation surface is curved or sloped. In addition, movement of the actuation device causes movement of the interaction member along the actuation surface in a first direction such that the coupler automatically secures the container to the lock.

4 Claims, 25 Drawing Sheets

(56) References Cited

U.S. PATENT DOCUMENTS

| | | |
|---|---|---|
| 4,382,734 A | 5/1983 | Synowiec et al. |
| 4,437,211 A | 3/1984 | Dorpmund |
| 4,459,072 A * | 7/1984 | Schulz ............... B60P 7/132 410/82 |
| 5,564,725 A | 10/1996 | Brazeal |
| 5,573,360 A | 11/1996 | Bennett |
| 5,575,599 A | 11/1996 | Conlee et al. |
| 5,829,946 A | 11/1998 | McNeilus et al. |
| 5,839,864 A | 11/1998 | Reynard |
| 6,409,192 B1 | 6/2002 | Botts |
| 6,565,299 B1 | 5/2003 | Guilbault et al. |
| 6,692,203 B2 | 2/2004 | Kim et al. |
| 7,240,936 B2 | 7/2007 | Petzitillo, Jr. et al. |
| 7,484,918 B2 | 2/2009 | Brewster |
| 8,348,564 B2 | 1/2013 | Fukui |
| 9,340,146 B2 | 5/2016 | Lanigan et al. |
| 9,387,792 B2 | 7/2016 | Lanigan et al. |
| 2008/0014040 A1 | 1/2008 | Ding |
| 2010/0303573 A1 | 12/2010 | Brewster |
| 2015/0232015 A1 | 8/2015 | Lanigan et al. |

FOREIGN PATENT DOCUMENTS

| | | |
|---|---|---|
| WO | WO 2008/095605 A1 | 8/2008 |
| WO | WO 2011/066829 A1 | 6/2011 |

OTHER PUBLICATIONS

International Search Report and Written Opinion dated Jun. 25, 2015, for International Application No. PCT/US2015/013552, Applicant, Mi-Jack Products, Inc. (15 pages).

International Search Report and Written Opinion dated Jul. 21, 2015, for International Application No. PCT/US2015/013577, Applicant, Mi-Jack Products, Inc. (10 pages).

* cited by examiner

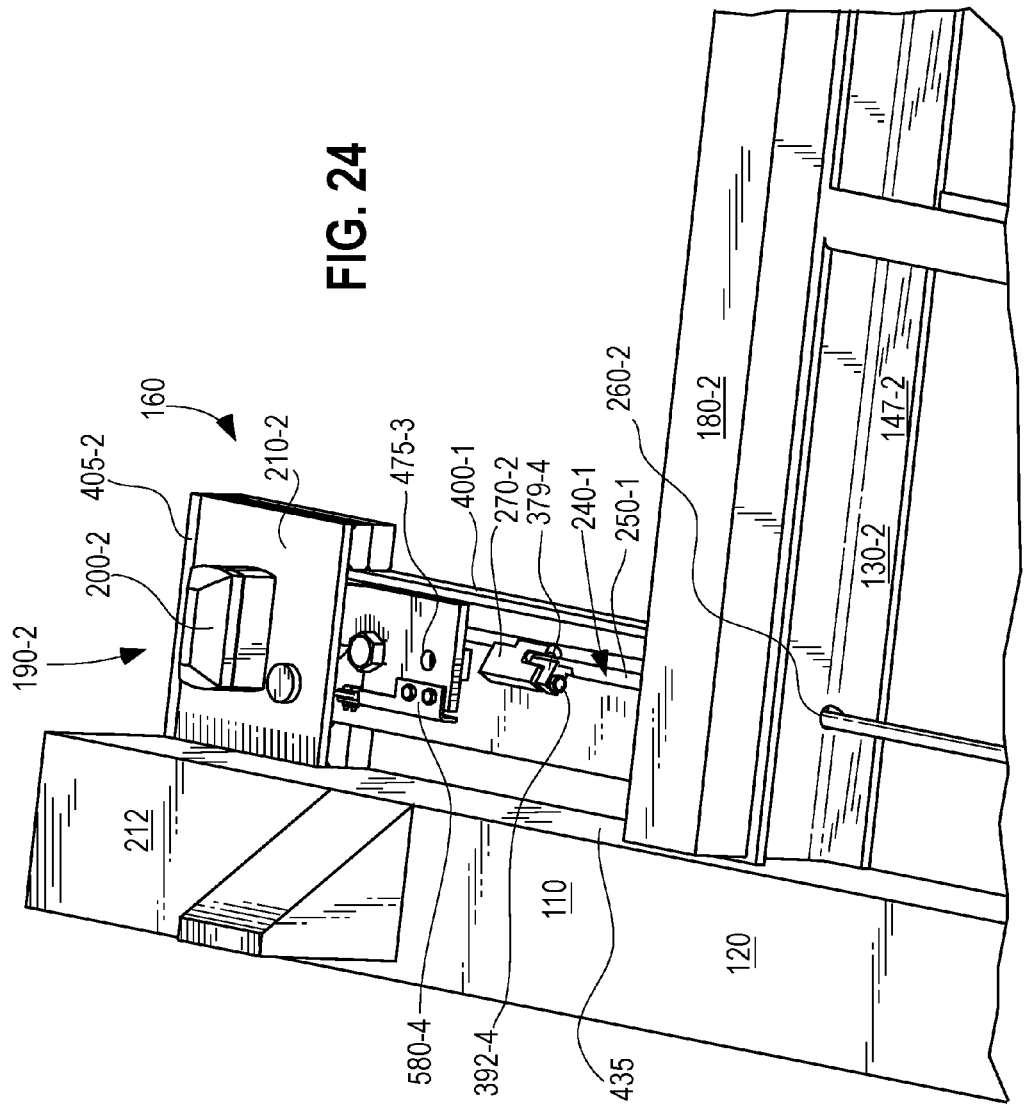

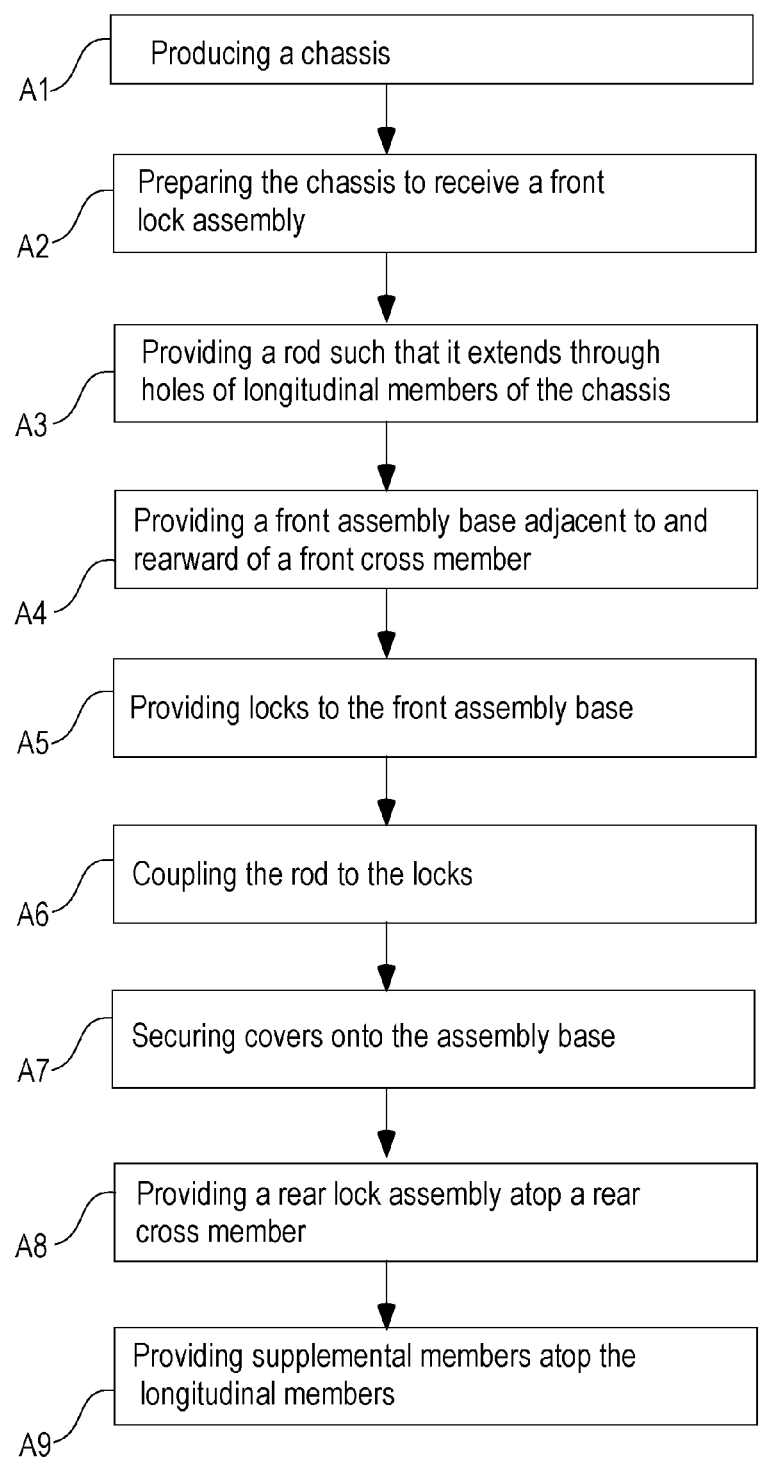

LOCKING SYSTEM FOR SECURING A CONTAINER

FIELD OF DISCLOSURE

The present subject matter relates to a locking system to secure a container to an apparatus, such as a trailer chassis. The present subject matter also relates to an interlock assembly associated with the locking system.

BACKGROUND

A semi-truck typically includes a trailer chassis and a tractor unit for hauling the trailer chassis. In order to transport goods, a container of goods may be placed onto the trailer chassis and secured thereto. The container is typically secured to the chassis using a locking system that includes a plurality of manually operated locks. Usually, the locking system includes two locks proximal a front of the chassis and two locks proximal a rear of the chassis. Typically, a truck driver or another person must remember to manually actuate the locks before the semi-truck is driven. If the truck driver inadvertently leaves a lock in an unactuated state, the container may become unsecured while the semi-truck is in motion, thus creating a risk of accident and damage to goods and persons. Another possibility is that an actuated lock becomes un-actuated while the semi-truck is in motion (because of the semi-truck making a sharp turn, for example), thus creating a risk of a corner of the container becoming unsecured or the entire container becoming unsecured. Thus, there exists a need for a new locking system that improves securement of the container to the chassis.

It may be difficult or expensive, however, to produce a trailer chassis that includes such a new locking system. This may be because, in order to function properly, portions of a new locking system may need to be disposed inside a front cross member, a rear cross member, and/or other components of the chassis. The complexity of a new locking system itself may add to the difficulty in putting such a system inside the chassis during manufacture.

Also, regardless of the difficulty in producing a new trailer chassis that includes a new locking system, there is the issue of the fleet of currently existing chassis. These existing chassis would have to be discarded in favor of new chassis or modified to include a new locking system. Modifying a currently existing chassis may be difficult and may require extensive changes to the front cross member, the rear cross member, and/or other components of the chassis.

Thus, there exists a need for a new locking system that allows for efficient production of a new chassis having a new locking system and/or allows an existing chassis to be efficiently modified to include a new locking system.

SUMMARY

According to one aspect, a lock for securing a container includes a lock platform, a coupler including a portion that is disposed above the lock platform, an interaction member associated with the coupler, and a linkage mechanism including an actuation device and an actuation surface. The actuation surface is curved or sloped. In addition, movement of the actuation device causes movement of the interaction member along the actuation surface in a first direction such that the coupler automatically secures the container to the lock.

According to another aspect, a locking system includes a lock assembly that includes a first lock and a second lock. The first and second locks are disposed on opposite sides of the lock assembly. The locking system further includes an interlock assembly coupled to the first and second locks. The interlock assembly includes a rod and at least one coupler member coupled to the rod. The coupler member has an outer end disposed in a recess of a linkage mechanism of the first lock.

According to yet another aspect, a container chassis includes a front cross member, a rear cross member, and at least one longitudinal member coupled to the front and rear cross members. The container chassis further includes a lock assembly adjacent the front cross member. The lock assembly includes a lock. The lock includes a coupler protruding upward and an upper surface adapted to receive a portion of the container. The upper surface is disposed lower than an upper surface of the front cross member. The lock assembly is adapted to automatically secure a container to the container chassis upon placement of the container on the container chassis.

According to yet another aspect, a method of producing a container chassis is disclosed. The chassis comprises a front cross member, a rear cross member, and at least one longitudinal member coupled to the front and rear cross members. The method includes providing a front assembly base adjacent the front cross member and rearward of the front cross member. The method further includes securing the front assembly base to the chassis. The method further includes providing at least one lock to the front assembly base. The lock includes a coupler that extends upward and an upper surface disposed lower than an upper surface of the front cross member. The lock is adapted to automatically secure a container to the chassis upon placement of the container on the chassis.

Other aspects and advantages will become apparent upon consideration of the following detailed description and the attached drawings wherein like numerals designate like structures throughout the specification.

BRIEF DESCRIPTION OF THE DRAWINGS

FIG. 24 is a side isometric view of the lock and a portion of the interlock assembly; and FIG. 25 shows a method for producing a chassis having a locking system as shown in FIGS. 1-24.

DETAILED DESCRIPTION

Figure 1:
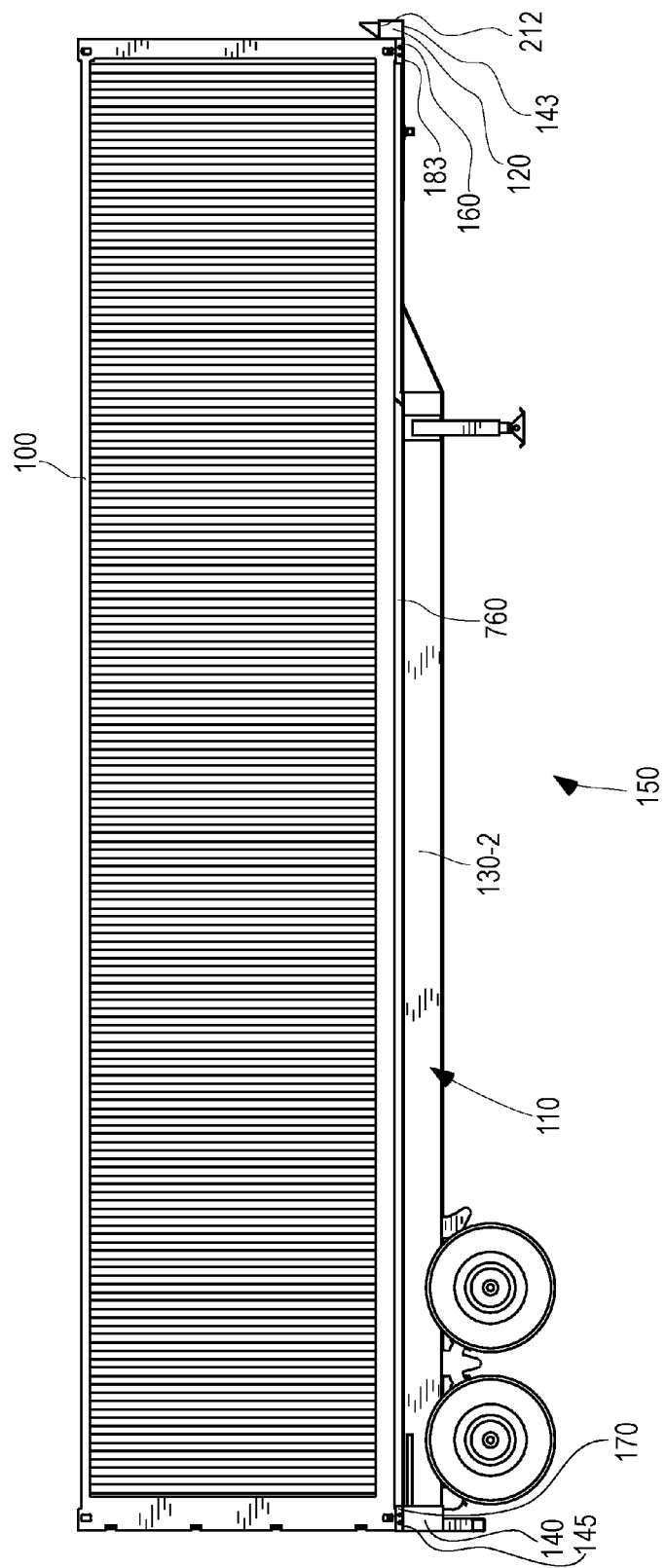
FIG. 1 is a side elevational view of a container disposed on a chassis that comprises a front lock assembly and a rear lock assembly.
Figure 2:
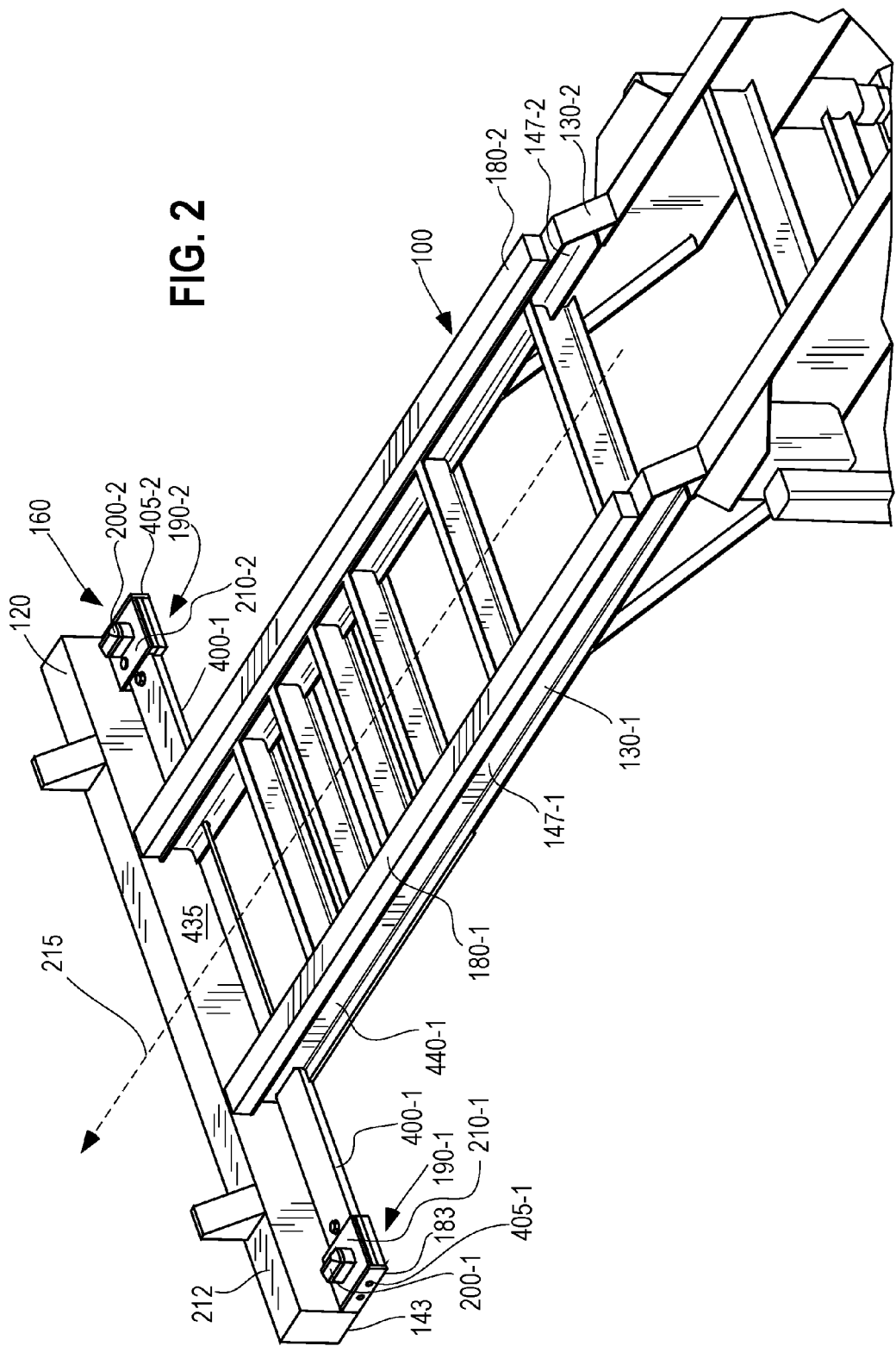
FIG. 2 is a top isometric view of the front lock assembly secured to the chassis.
Figure 3:
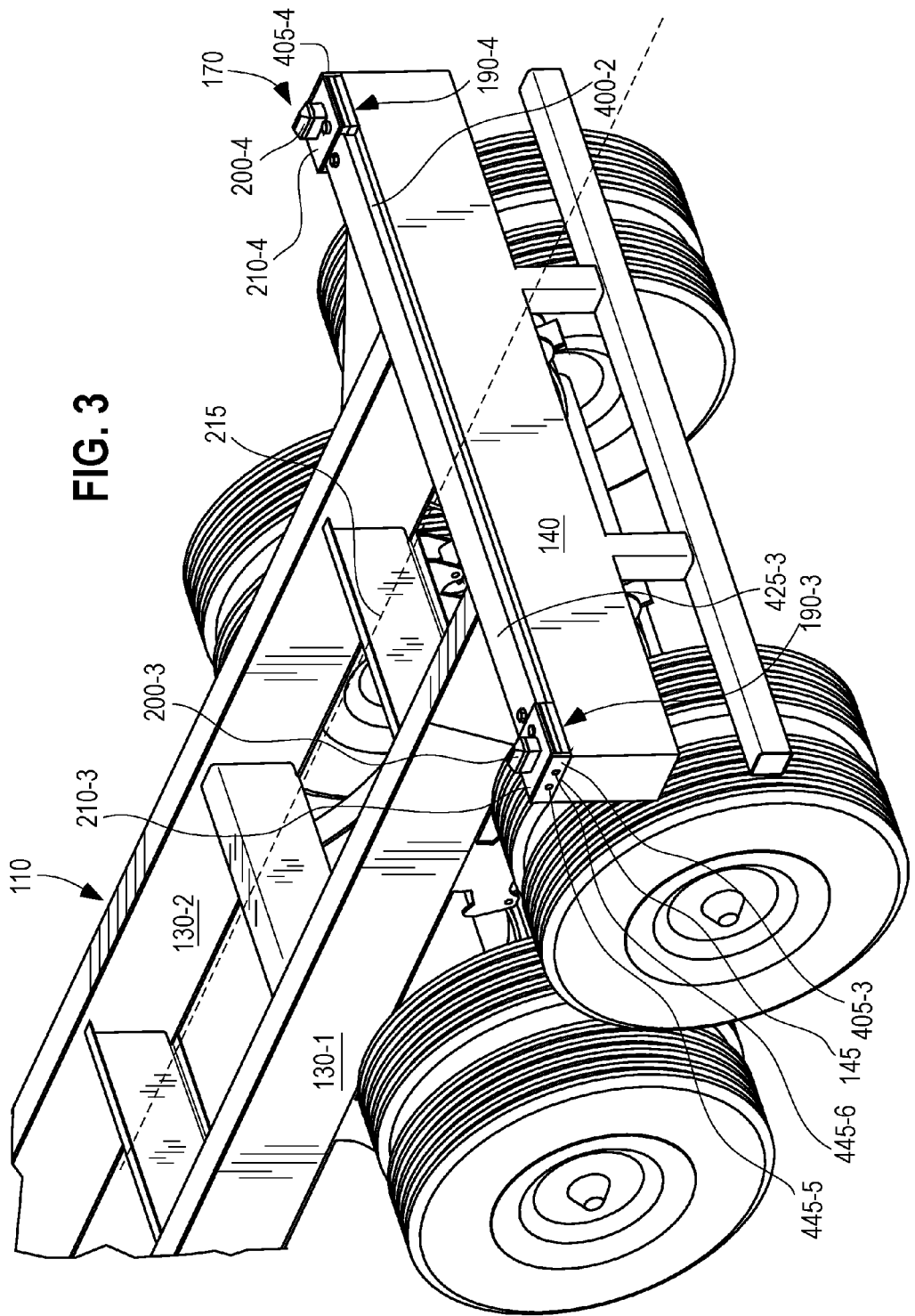
FIG. 3 is a top isometric view of the rear lock assembly secured to the chassis.

A container 100 may be disposed on a trailer chassis 110, as shown in FIG. 1. The trailer chassis 110 includes a front cross member 120 shown in FIGS. 1 and 2, two longitudinal members 130-1 and 130-2 shown in FIGS. 2 and 3, and a rear cross member 140 shown in FIGS. 1 and 3. As shown in FIGS. 1-3, the two longitudinal members 130-1, 130-2 extend between the front cross member 120 and the rear cross member 140. The two longitudinal members 130-1, 130-2 may be integral with the front and rear cross members 120, 140 or coupled thereto. The chassis 110 shown, in this example, is a gooseneck chassis in which a bottom surface 143 of the front cross member 120 is roughly at the same height as a top surface 145 of the rear cross member 140, as shown in FIG. 1. Also, the first and second longitudinal members 130-1, 130-2 include raised portions 147-1 and 147-2, respectively, as shown in FIG. 2. Optionally, the chassis 110 may be a 53 foot long chassis, a 40 foot long chassis, or a 20 foot long chassis. However, chassis of other lengths may be selectively employed. Optionally, the container 100 may include a gooseneck tunnel.

The container 100 is secured to the trailer chassis 110 using a locking system 150. The locking system 150 includes a front lock assembly 160, a rear lock assembly 170, and two supplemental members 180-1 and 180-2. The front and rear lock assemblies 160, 170 may each be adapted to automatically secure the container 100 to the chassis 110 upon placement of the container 100 on the chassis 110. As shown in FIG. 2, the front lock assembly 160 is disposed adjacent to and rearward of the front cross member 120. A bottom surface 183 of the front lock assembly 160 is substantially level with the bottom surface 143 of the front cross member 120, as further shown in FIG. 5. In other embodiments, the front lock assembly 160 may be disposed above or below the level of the bottom surface 143 of the front cross member 120. Referring again to FIG. 5, the bottom surface 183 extends rearward form the front cross member 120. Referring again to FIG. 2, the front lock assembly 160, in this example, is attached to the front cross member 120. Additionally, the front lock assembly 160 is attached to the longitudinal members 130-1 and 130-2, as further shown in FIGS. 2 and 11. In other embodiments, the front lock assembly 160 may be attached to the front cross member 120 without being attached to the longitudinal members 130-1, 130-2. Alternatively, the front lock assembly 160 may be attached to the longitudinal members 130-1, 130-2 without being attached to the front cross member 120.

Figure 6:
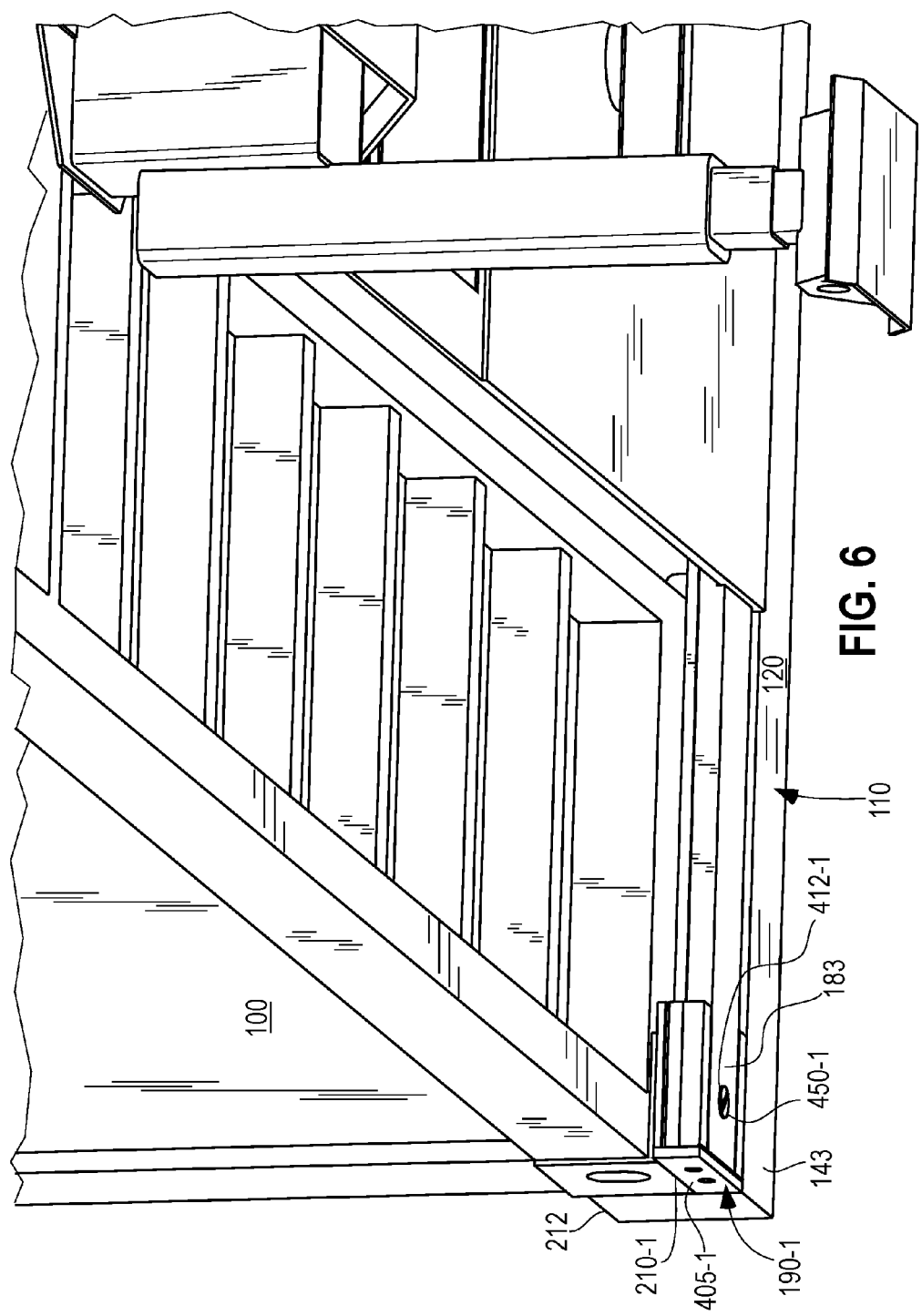
FIG. 6 is a rear isometric view of a portion of the front lock assembly, with a container disposed on the chassis.

Referring now to FIG. 3, the rear lock assembly 170 is disposed atop the rear cross member 140, with a bottom surface of the rear lock assembly 170 in contact with a top surface 145 of the rear cross member 140. Referring now to FIG. 2, the first and second supplemental members 180-1, 180-2 are disposed atop the first and second longitudinal members 130-1, 130-2, respectively. It should be noted that a height of the front lock assembly 160 may be identical to a height of the rear lock assembly 170, as shown in FIG. 1. Similarly, a height of the front lock assembly 160 may be identical to a height of the supplemental members 180-1, 180-2, as shown in FIG. 6.

Some embodiments of the locking system 150 may include front lock assembly 160 without including rear lock assembly 170 (such embodiments may utilize another lock assembly proximal the rear cross member 140, such as manually operated or automatic twist-locks or swing-locks). Other embodiments of the locking system 150 may include the rear lock assembly 170 without including the front lock assembly 160 (such embodiments may utilize another lock assembly proximal the front cross member 140, such as manually operated or automatic pin-locks).

The front lock assembly 160 includes first and second locks 190-1 and 190-2 disposed on opposite sides of the front lock assembly 160, as shown in FIG. 2. The rear lock assembly 170 includes third and fourth locks 190-3 and 190-4, as shown in FIG. 3. In the illustrated embodiment, the first, second, third, and fourth locks 190-1, 190-2, 190-3, and 190-4 are substantially similar, and preferably identical. As shown in FIG. 2, the first lock 190-1 includes a coupler 200-1 protruding upward from an upper surface 210-1 of the first lock 190-1. In this example, the upper surface 210-1 is disposed higher than the bottom surface 143 of the front cross member 120. Moreover, the upper surface 210-1 is disposed lower than the upper surface 212 of the front cross member 120. The upper surface 210-1 is adapted to receive a portion of the container 100.

It should be understood that generally, the front lock assembly 160 is similar or identical to the rear lock assembly 170, unless otherwise noted herein or shown in the FIGS. Moreover, the port side of the front lock assembly 160 (shown in FIG. 2) is similar or identical to (i.e., a mirror image about a central longitudinal axis 215) the starboard side of the front lock assembly 160, unless otherwise noted herein or shown in the FIGS. Similarly, the port side of the rear lock assembly 170 is similar or identical to (i.e., a mirror image about the central longitudinal axis 215) the starboard side of the rear lock assembly 170, unless otherwise noted herein or shown in the FIGS. For the sake of clarity, similar or identical components are given the same reference number prefix, but a different suffix (e.g., 190-1, 190-2, 190-3, etc. all refer to the same type of lock 190). The order of the suffix is generally from front to rear and from port to starboard within the front and the rear (e.g., 190-1 is the front port lock 190, 190-2 is the front starboard lock 190-2, 190-3 is the rear port lock 190, and so on). Disclosure in relation to a component should be applied to all similar or identical components having the same reference number prefix (e.g., disclosure in relation to the lock 190-4 should be applied to all of the locks 190-1 through 190-4), unless otherwise disclosed herein or in the FIGS.

Figure 5:
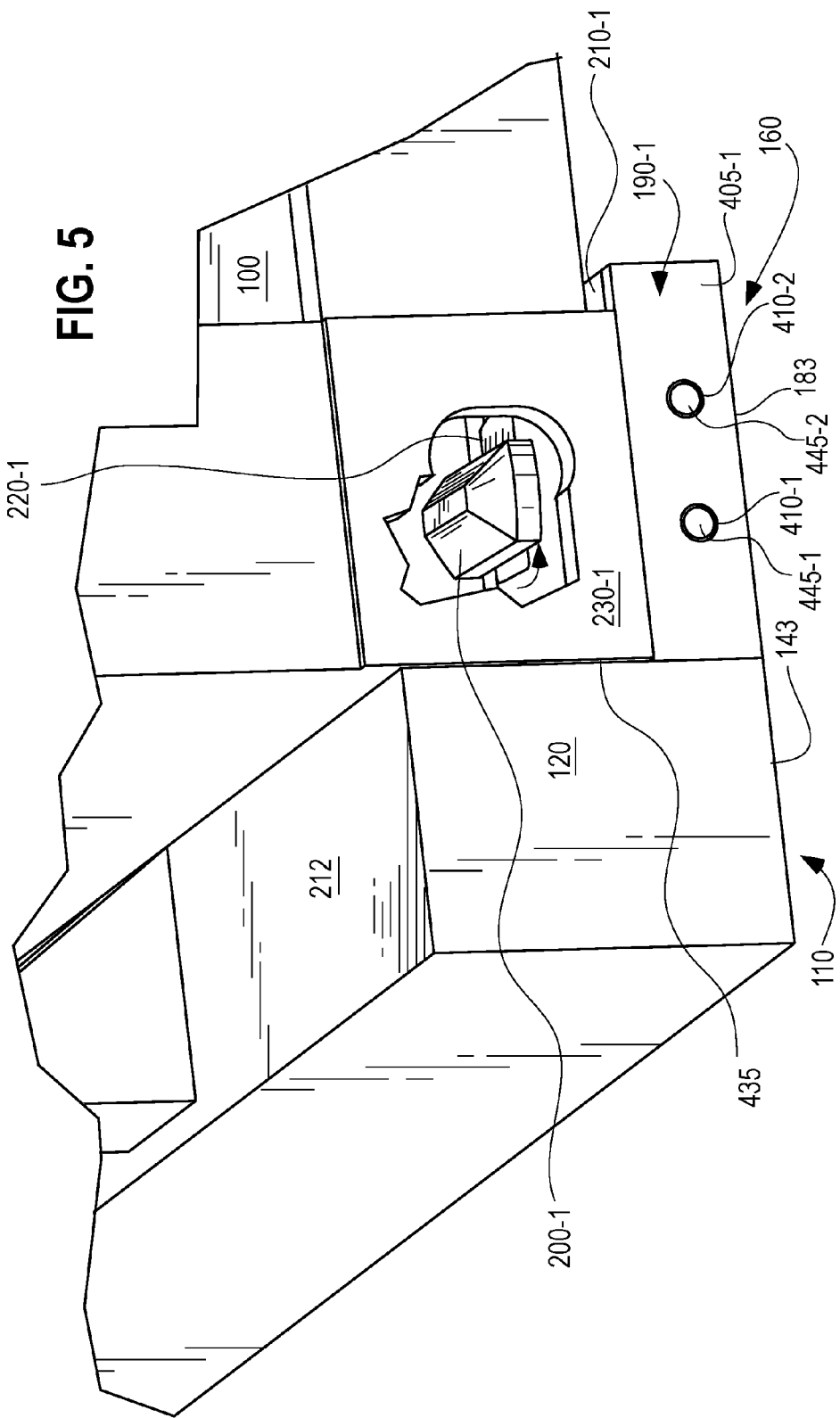
FIG. 5 is a top isometric view of a portion of the front lock assembly, with a container disposed on the chassis.

Referring now to FIG. 5, the coupler 200-1 is adapted to extend through a hole 220-1 on a bottom side of a corner casting 230-1 of the container 100 when a container 100 is lowered onto the chassis 110. Additionally, the upper surface 210-1 is adapted to receive a bottom surface of the corner casting 230-1 when the container 100 is lowered onto the chassis 110. Upon placement of the container 100 onto the chassis 110, the four corner castings 230 of the container 100 are lowered onto the four locks 190 such that the four couplers 200 extend through a bottom hole 220 of the four corner castings 230. As the container 100 is lowered further, the locks 190 are automatically actuated, thereby causing the four couplers 200 to rotate such that the container 100 is secured to the chassis 110.

Figure 10:
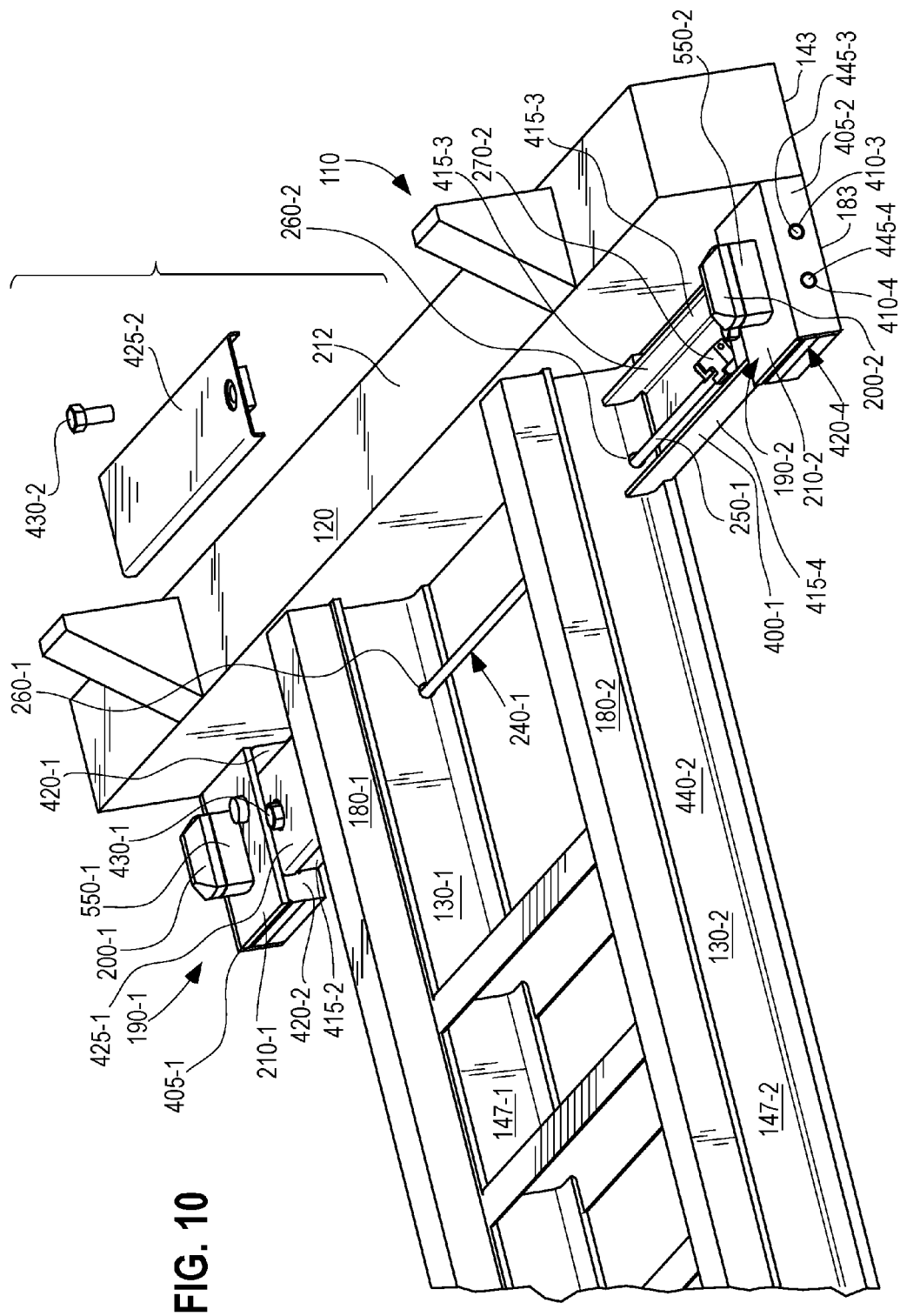
FIG. 10 is a partially exploded top isometric view of the front lock assembly, with a top cover of the assembly in a raised position.
Figure 14:
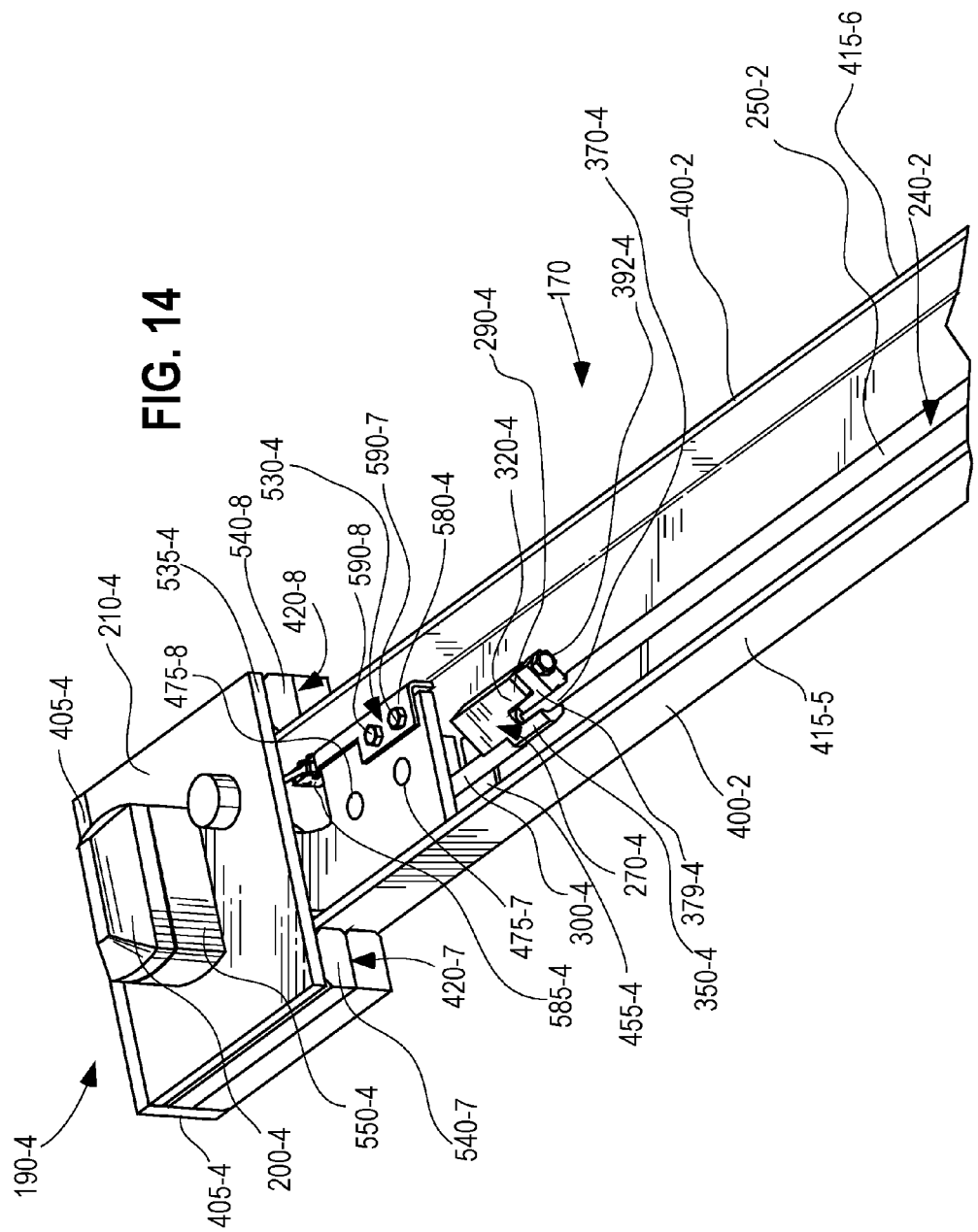
FIG. 14 is a fragmentary top isometric view of the rear lock assembly without a top cover.
Figure 15:
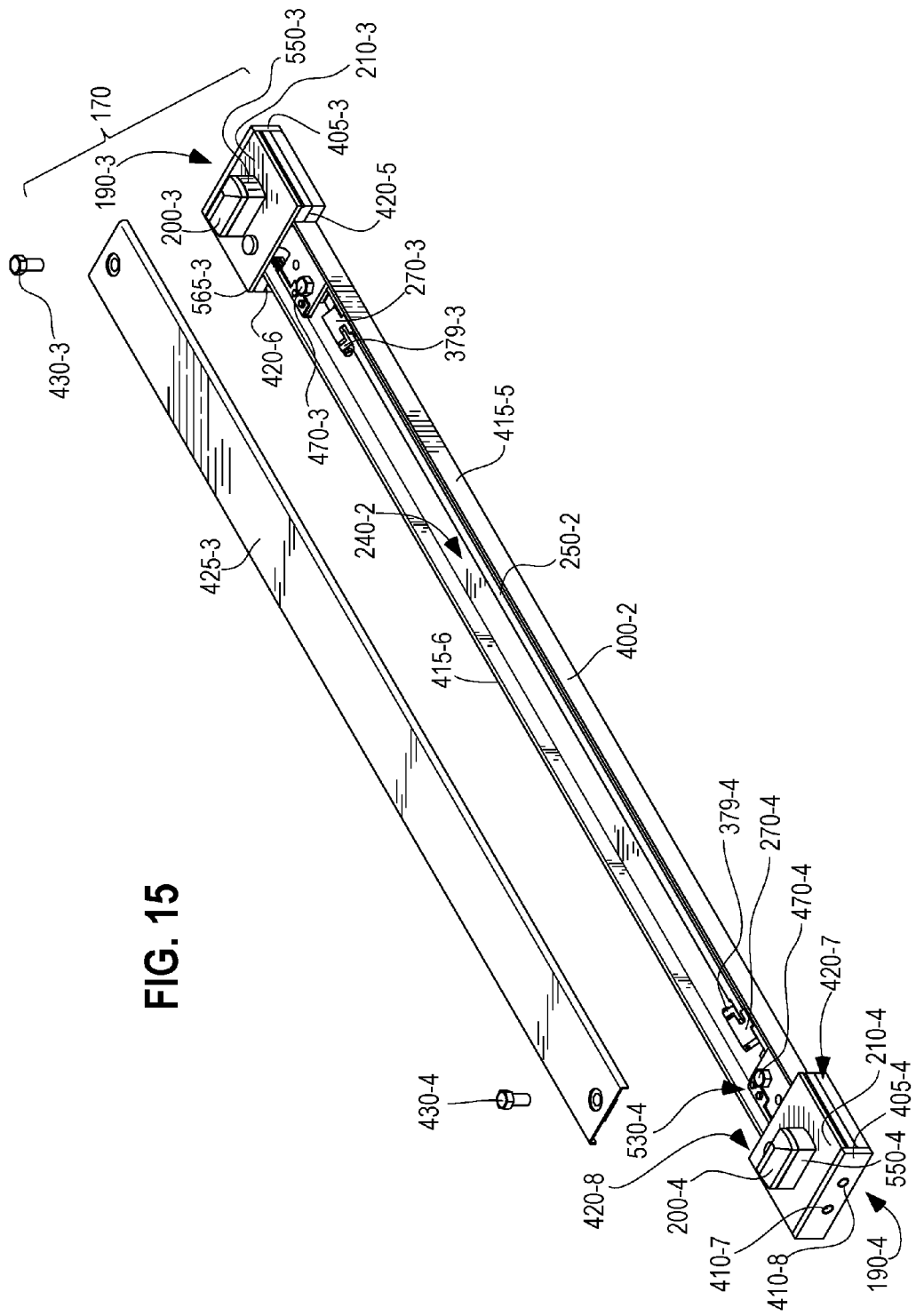
FIG. 15 is a top isometric view of the rear lock assembly with a top cover raised above an assembly base.

In addition to the locks 190-1, 190-2, the front lock assembly 160 further includes an interlock assembly 240-1 that extends between and is coupled to the locks 190-1, 190-2, as shown in FIG. 10. Similarly, the rear lock assembly 170 further includes an interlock assembly 240-2 that extends between and is coupled to the locks 190-3, 190-4, as shown in FIG. 15. The interlock assembly 240-1 is substantially similar, and may be identical, for example, to the rear interlock assembly 240-2 shown in FIGS. 13-15, except that the interlock assembly 240-1 includes a rod 250-1 that extends through a hole 260-1 of the longitudinal member 130-1 and through a hole 260-2 of the longitudinal member 130-2, as shown in FIG. 10 (by contrast, the rod 250-2 of the rear interlock assembly 240-2 does not extend through the longitudinal members 130-1, 130-2).

Figure 13:
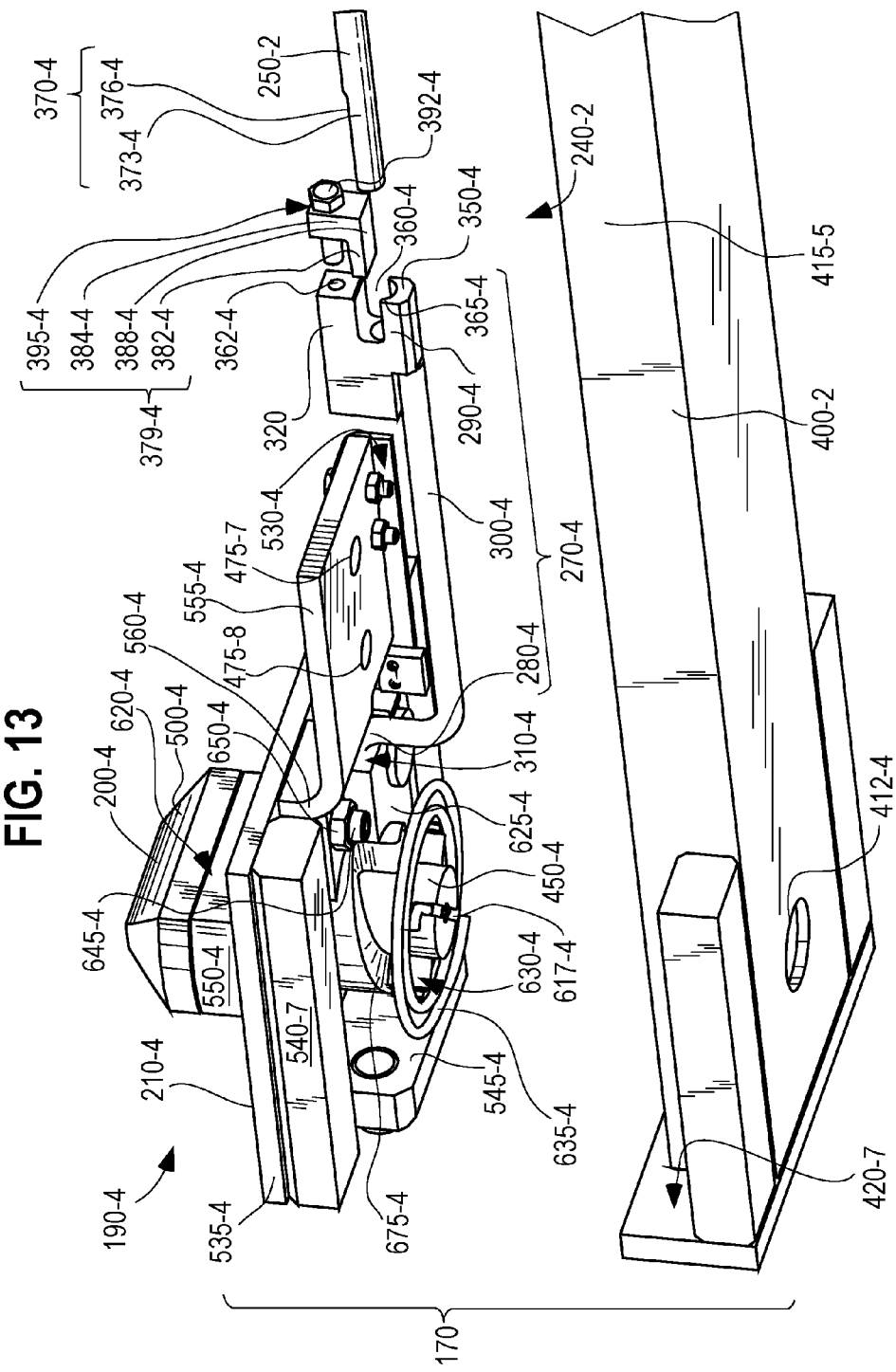
FIG. 13 is a fragmentary exploded side isometric view of the rear lock assembly, with a lock and an interlock assembly in a raised position above an assembly base.

The interlock assembly 240-2 further includes a coupler arm 270-3 proximal the third lock 190-3 and a coupler arm 270-4 proximal the fourth lock 190-4, as shown in FIG. 13. As further shown in FIG. 13, the coupler arm 270-4 comprises an outer end 280-4 secured to the lock 190-4, an inner portion 290-4 coupled to the interlock rod 250-2, and a base portion 300-4 extending between the outer end 280-4 and the inner portion 290-4.

The outer end 280-4 is secured to the lock 190-4 by, for example, the outer end 280-4 being disposed within a recess 310-4 in the lock 190-4 and being rotatable within the recess 310-4, as shown in FIG. 13. As further shown, the inner portion 290-4 has a C-shape and comprises an overhang 320-4, an underhang 350-4, and a recess 360-4 disposed between the overhang 320-4 and the underhang 350-4. The overhang 320-4 includes a lateral aperture 362-4. The recess 360-4 includes a curved first surface 365-4 that is concave and defines a floor of the recess 360-4. It should be noted that an end 370-4 of the interlock rod 250-2 has a curved first surface 373-4 that is convex and a flat second surface 376-4, shown in FIG. 13 (perhaps seen better with respect to the front interlock assembly 240-1 shown in FIG. 9). The flat second surface 376-4 is disposed opposite the curved first surface 373-4, in this example.

As further shown in FIG. 13, the interlock assembly 240-2 further includes an L-shaped insert 379-4 having a first portion 382-4 disposed laterally within the recess 360-4 and a second portion 384-4 integral with the first portion 382-4 and normal thereto, with the first portion 382-4 being disposed between the end 370-4 of the interlock rod 250-2 and the overhang 320-4 of the coupler arm 270-4. Further, the end 370-4 is disposed within the recess 360-4 between the L-shaped insert 379-4 and the underhang 350-4. Moreover, the curved first surface 373-4 of the interlock rod 250-2 is disposed adjacent and mated to the curved first surface 365-4 of the recess, as shown in FIG. 14. Further, the flat second surface 376-4 of the interlock rod 250-2 is disposed adjacent and mated to a flat bottom surface 388-4 of the L-shaped insert, shown in FIG. 13. As further shown in FIG. 14, the interlock rod 250-2 and the L-shaped insert 379-4 are secured to the coupler arm 270-4 by a lateral screw 392-4 that extends through a lateral aperture 395-4 of the second portion 384-4 of the L-shaped insert 379-4. Also for securement, the lateral screw 392-4 extends into the lateral aperture 362-4 of the coupler arm 270-4. In other embodiments, the interlock rod 250-2 may be coupled to the lock 190-4 using other components that cause a rotation in the rod 250-2 when the lock 190-4 is actuated.

As the lock 190-4 is actuated by placement of the container 100 on the chassis 110 (and thereby, on the lock 190-4), the recess 310-4 moves downward and thus, the outer end 280-4 of the coupler arm 270-4 moves downwards with the recess 310-4 and rotates with respect to the recess 310-4. Moreover, the base portion 300-4 rotates because of the movement of the outer end 280-4. The rotation of the base portion 300-4 causes rotation of the inner portion 290-4 of the coupler arm 270-4. As a result, the interlock rod 250-2 rotates because the interlock rod 250-2 is secured to the inner portion 290-4. The rotation of the interlock rod 250-2 causes rotation of the coupler arm 270-3 on the opposite side of the rear interlock assembly 240-2 (rotation of the coupler arm 270-3 includes downward movement of an outer end 280-3 of the coupler arm 270-3) and prevents the outer end 280-3 from moving upward, which, in turn, prevents un-actuation of the lock 190-3.

Thus, the rear interlock assembly 240-2 is coupled to the locks 190-3 and 190-4 such that un-actuation of both locks 190-3 and 190-4 is necessary for un-securement of the container from either lock 190-3 or 190-4. In the same way, the front interlock assembly 240-1 is coupled to locks 190-1 and 190-2 such that un-actuation of both locks 190-1 and 190-2 is necessary for un-securement of the container 100 from either lock 190-1 or 190-2. In this manner, the interlock assemblies 240-1, 240-2 maintain securement of the container 100 to the chassis 110 even when one lock 190 associated with either interlock assembly 240-1, 240-2 no longer has a downward actuating force applied thereon (for example, because a corner casting 230 of the container 100 lifts off a lock 190 because of a sharp turn of the associated semi-truck).

Figure 4:
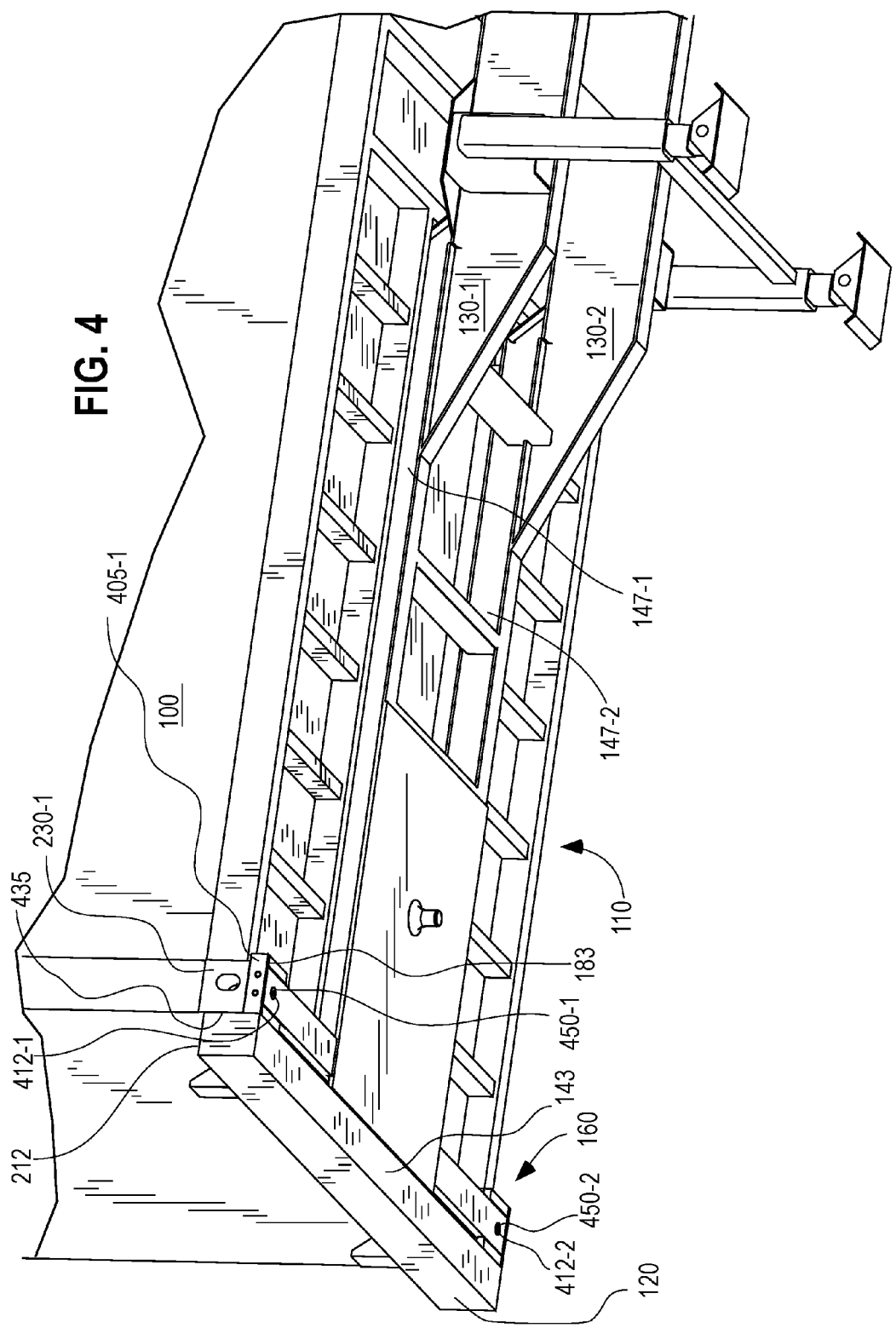
FIG. 4 is a bottom isometric view of the front lock assembly, with a container disposed on the chassis.
Figure 8:
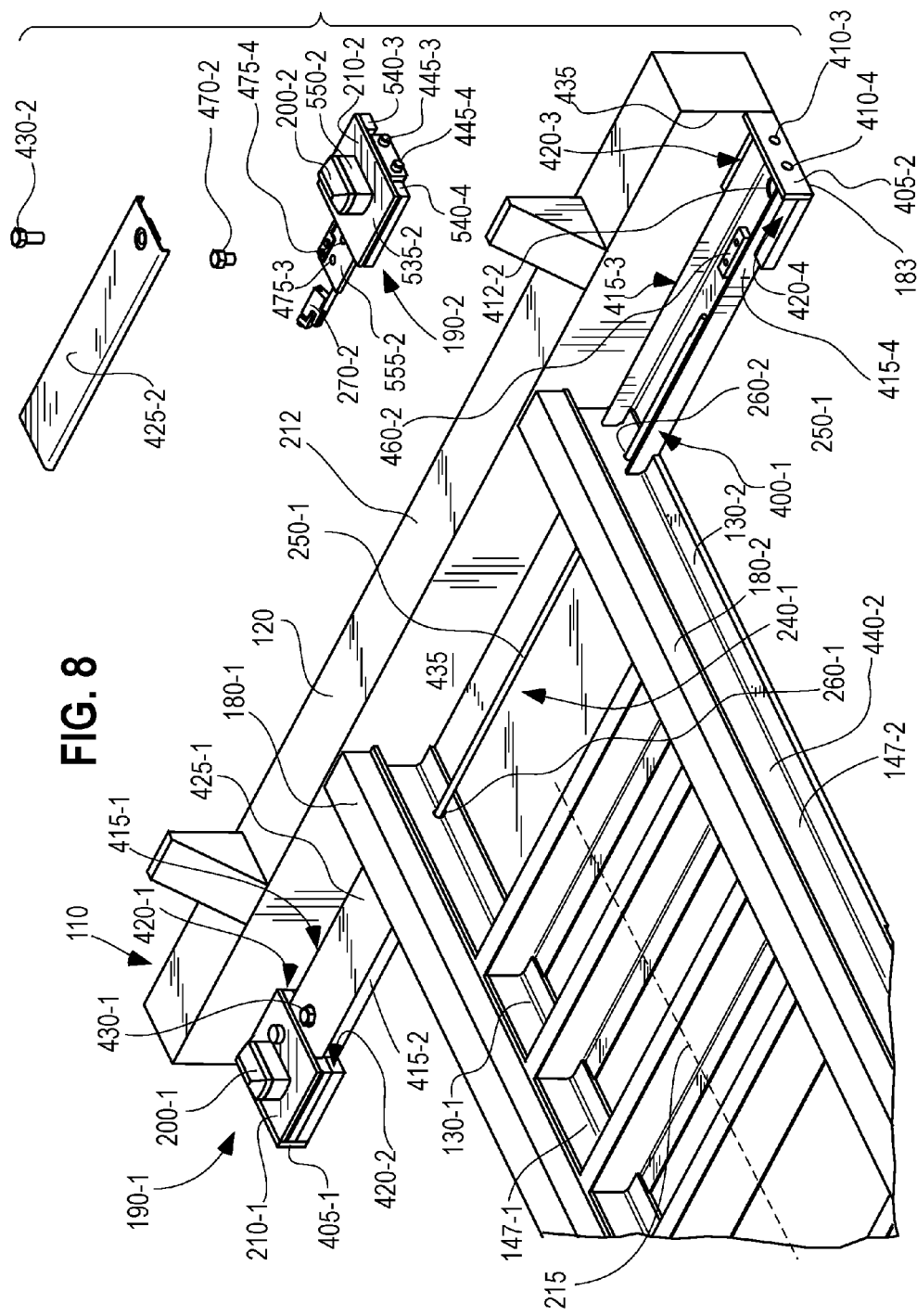
FIG. 8 is a partially exploded top isometric view of the front lock assembly.
Figure 9:
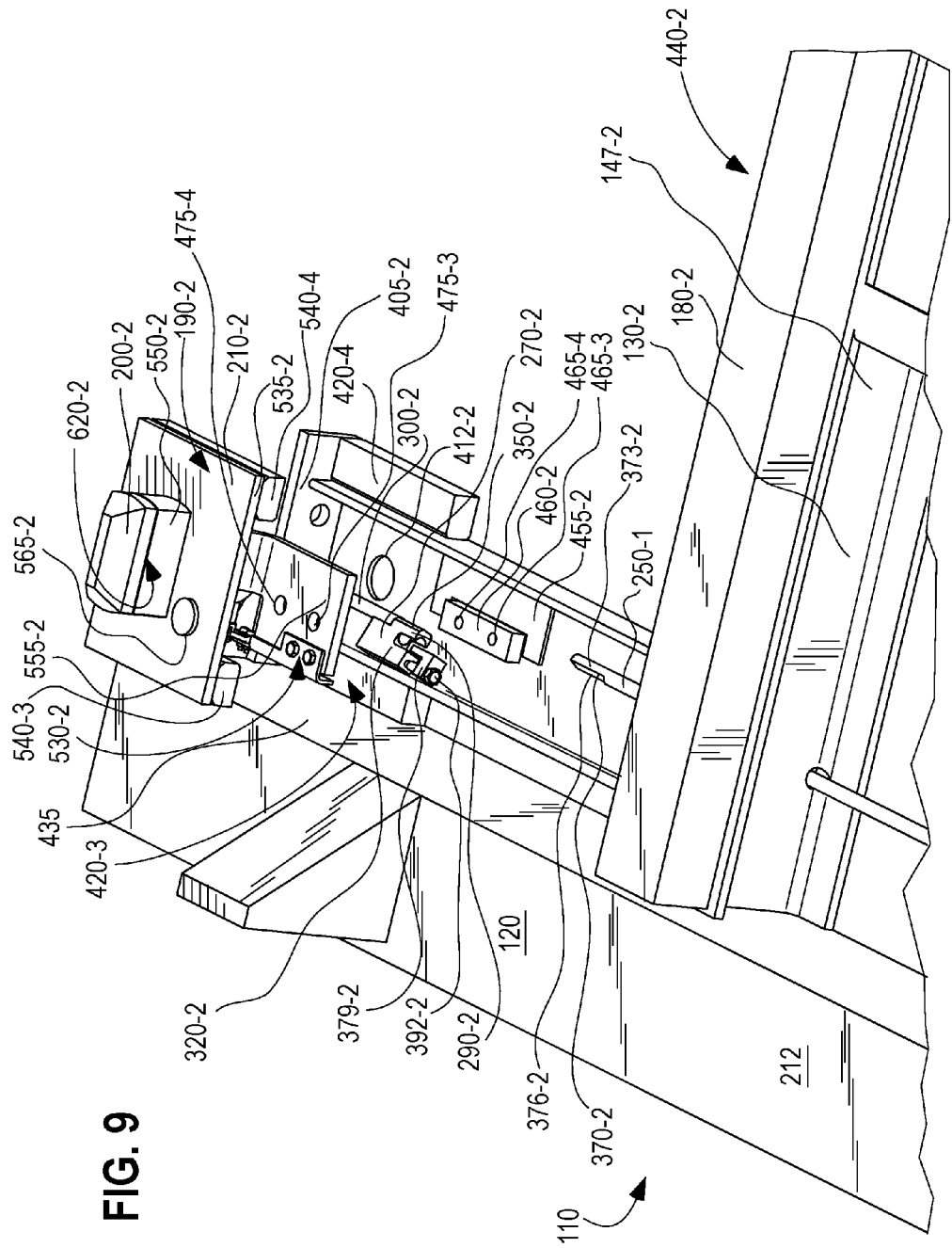
FIG. 9 is a fragmentary partially exploded isometric view of the front lock assembly.
Figure 11:
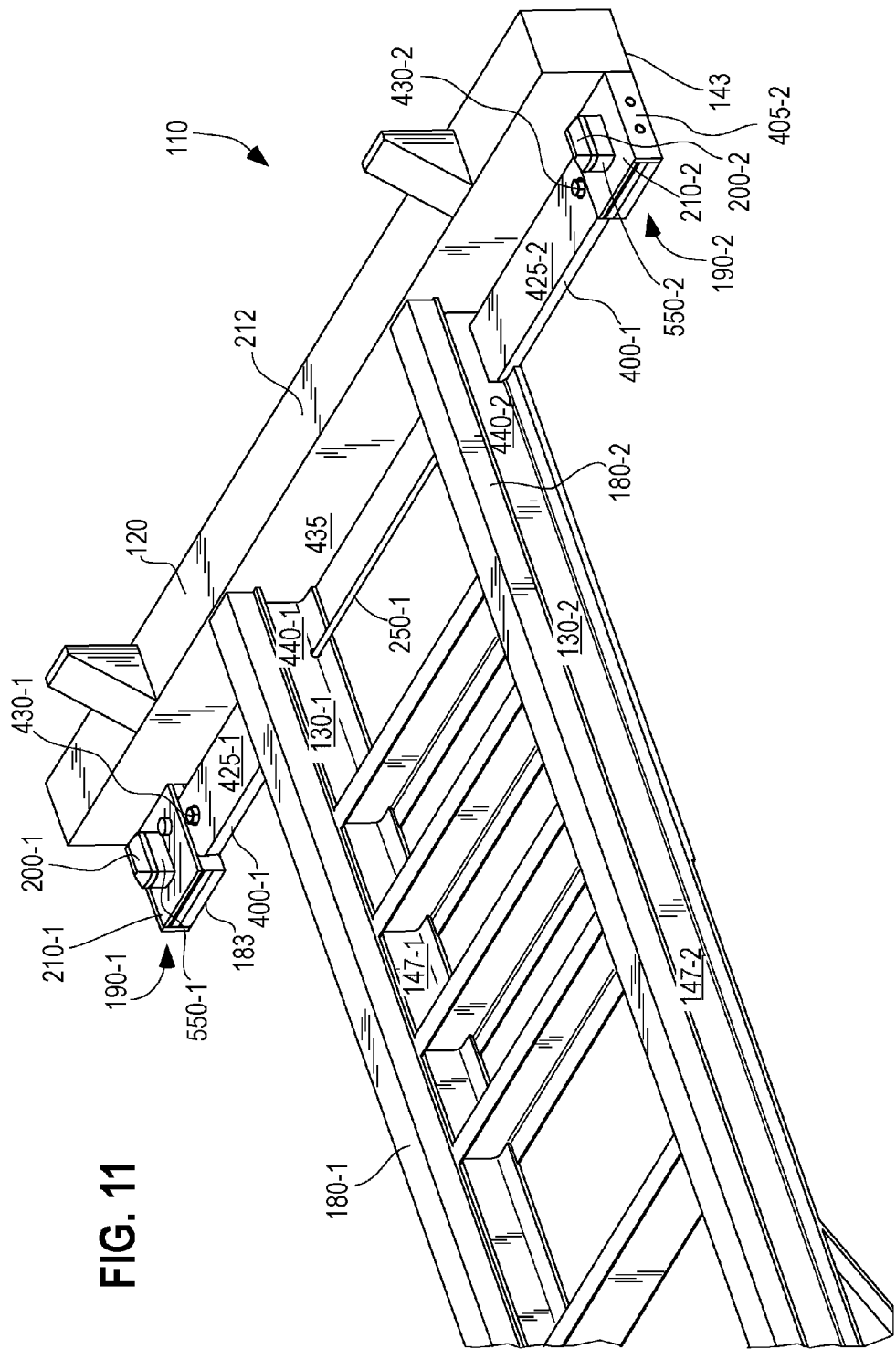
FIG. 11 is a top isometric view of the front lock assembly, with the top cover secured to the assembly.

Referring now to FIG. 10, the locks 190-1, 190-2 and the interlock assembly 240-1 are disposed on a front assembly base 400-1. The front assembly base 400-1 includes first and second end plates 405-1, 405-2, disposed proximal the first and second locks 190-1, 190-2, respectively. The end plate 405-1 includes two apertures 410-1, 410-2 and the end plate 405-2 includes two apertures 410-3, 410-4, shown in FIG. 8. The front assembly base 400-1 further includes a bottom aperture 412-1 disposed along a bottom surface of the base 400-1 and proximal to the first lock 190-1, as shown in FIG. 4. The base 400-1 further includes a bottom aperture 412-2 disposed along a bottom surface of the base 400-1 and proximal the second lock 190-2, as shown in FIG. 9. The front assembly base 400-1 further comprises two vertical members 415-1, 415-2, each extending between the first longitudinal member 130-1 and the first end plate 405-1, as further shown in FIG. 8. Moreover, the front assembly base 400-1 further comprises two vertical members 415-3, 415-4, each extending between the second longitudinal member 130-2 and the second end plate 405-2. The first and second vertical members 415-1, 415-2 are adjacent first and second slots 420-1, 420-2, respectively, as further shown in FIG. 8. Similarly, the third and fourth vertical members 415-3, 415-4 are adjacent third and fourth slots 420-3, 420-4, respectively. Referring now to FIG. 10, front assembly covers 425-1 and 425-2 are disposed atop the front assembly base 400-1 and secured thereto by outer bolts 430-1 and 430-2 that extend through apertures in the covers 425-1, 425-2, as shown in FIG. 11.

Figure 12:
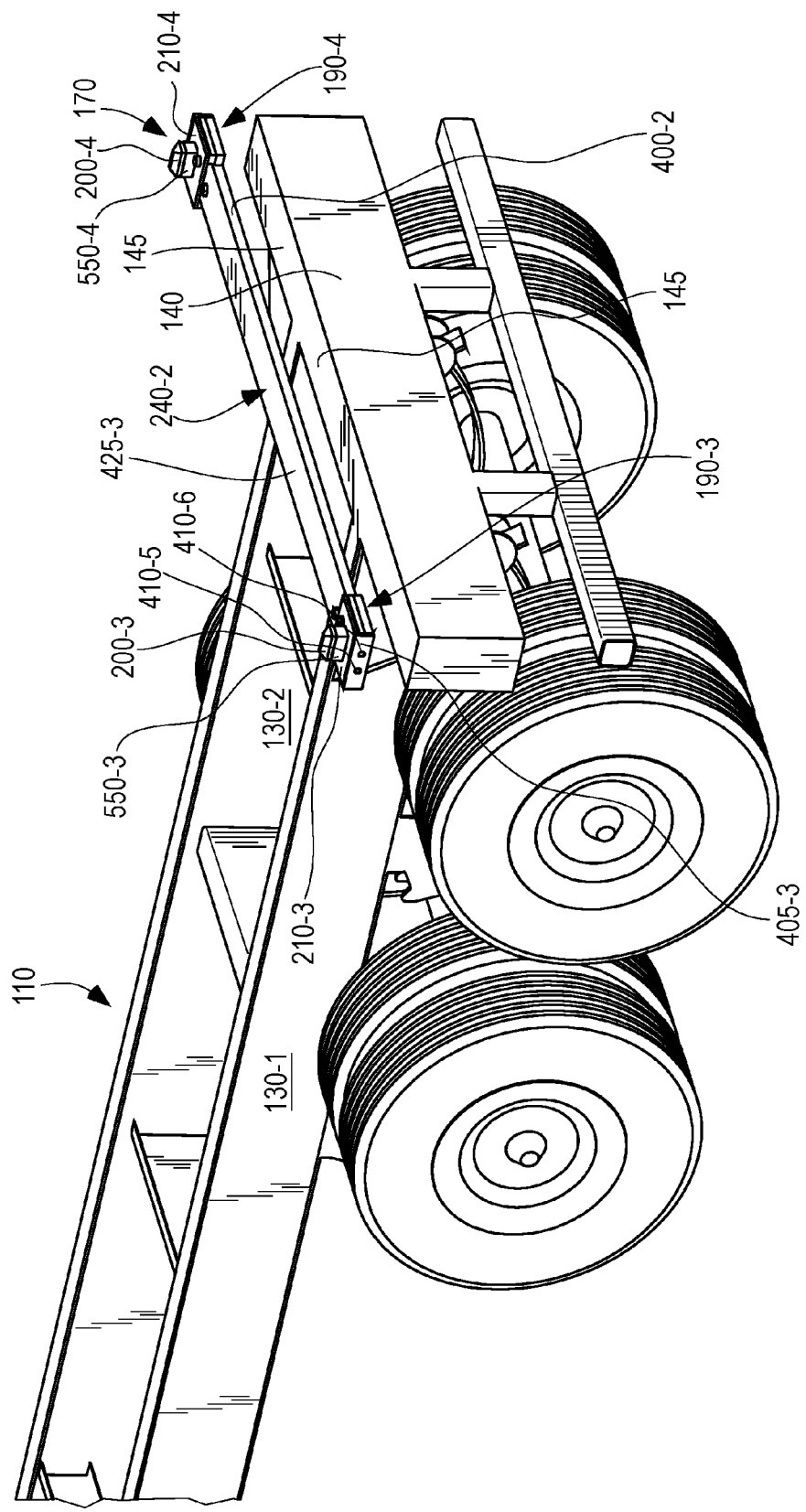
FIG. 12 is a top isometric view of the rear lock assembly in a raised position above the chassis.

Referring now to FIG. 15, the locks 190-3, 190-4 and the interlock assembly 240-2 are disposed on a rear assembly base 400-2. The rear assembly base 400-2 includes an end plate 405-3 proximal the third lock 190-3 and an end plate 405-4 proximal the fourth lock 190-4. The end plate 405-3 includes two apertures 410-5, 410-6, shown in FIG. 12, and the end plate 405-4 includes two apertures 410-7, 410-8, shown in FIG. 15. The rear assembly base 400-2 further includes a bottom aperture 412-3 disposed in a bottom surface of the base 400-2 and proximal the third lock 190-3. Moreover, the base 400-2 further includes a bottom aperture 412-4 disposed in a bottom surface of the base 400-2 and proximal the fourth lock 190-4. The rear assembly base 400-2 further includes a fifth vertical member 415-5 extending between the end plate 405-3 and the end plate 405-4, as shown in FIGS. 13 and 15. As further shown, the rear assembly base 400-2 further includes a sixth vertical member 415-6 disposed rearward of the fifth vertical member 415-5 and extending between the end plates 405-3 and 405-4. The fifth and sixth vertical members 415-5, 415-6 are adjacent to fifth and sixth slots 420-5, 420-6 proximal the third lock 190-3, as shown in FIG. 15, and are adjacent to seventh and eighth slots 420-7, 420-8 proximal the fourth lock 190-4. Referring now to FIG. 12, a rear assembly cover 425-3 is disposed atop the rear assembly base 400-2 and is secured thereto by outer bolts 430-3 and 430-4 that extend through apertures in the cover 425-3, shown in FIG. 15.

Other embodiments of the locking system 150 may include different bases 400-1, 400-2 that provide sufficient structural support to the locks 190-1 through 190-4 in order to withstand the stresses caused by the weight of the container 100.

Producing the embodiment shown in the FIGS. (i.e., a chassis 110 having the locking system 150) may include the following method 432 that comprises the steps shown in FIG. 25.

The method 432 may include producing the chassis 110 shown in FIG. 1 (FIG. 25—step A1). Producing the chassis 110 may include producing the front cross member 120, the longitudinal members 130-1, 130-2, and/or the rear cross members 120. Alternatively, instead of producing the chassis 110, the method 432 may include obtaining an already-produced chassis 110 that includes the front cross member 120, the longitudinal members 130-1, 130-2, and/or the rear cross members 120. The already-produced chassis may be obtained so that it can be modified to include the locking system 150. The already-produced chassis may be a part of a fleet of used chassis, or alternatively, may be a new chassis.

The method 432 may further include preparing the chassis 110 to receive the front lock assembly 160 (FIG. 25—step A2). Preparing the chassis 110 may include creating the hole 260-1 in the longitudinal member 130-1. The hole 260-1 may be created in the raised portion 147-1 of the longitudinal member 130-1 and may be created proximal the front cross member 120, as shown in FIG. 10. Preparing the chassis 110 may further include creating the hole 260-2 in the longitudinal member 130-2. The hole 260-2 may be created in the raised portion 147-2 of the longitudinal member 130-2 and may be created proximal the front cross member 120, as shown in FIG. 10.

The method 432 may further include providing the rod 250-1 such that it extends through the holes 260-1, 260-2, as shown in FIG. 10 (FIG. 25—step A3). The rod is disposed horizontally such that a central longitudinal axis of the rod 250-1 is perpendicular to the axis 215.

The method 432 may further include providing the front assembly base 400-1 adjacent to and rearward of the front cross member 120, as shown in FIG. 5 (FIG. 25—step A4). Providing the front assembly base 400-1 may include securing the front assembly base 400-1 to (for example, by welding, by using fasteners, or by manufacturing integrally) a rear surface 435 of the front cross member 120, as shown in FIG. 8. Further, the front assembly base 400-1 may be secured to a side surface 440-1 of the first longitudinal member 130-1, as shown in FIG. 2, and to a side surface 440-2 of the second longitudinal member 130-2, as shown in FIG. 8. The side surface 440-1 may be a part of the raised portion 147-1 and the side surface 440-2 may be a part of the raised portion 147-2.

The method 432 may further include providing the locks 190-1 and 190-2 to the front assembly base 400-1 (FIG. 25—step A5). The lock 190-1 may be provided to the front assembly base 400-1 such that pins 445-1 and 445-2 of the lock 190-1 are disposed in the apertures 410-1, 410-2 of the end plate 405-1, as shown in FIG. 5. Further, the lock 190-2 may be provided to the front assembly base 400-2 such that pins 445-3 and 445-4 of the lock 190-2 are disposed in the apertures 410-3, 410-4 of the end plate 405-2, as shown in FIG. 10. The lock 190-1 is provided such that a shaft 450-1 attached to or integral with the coupler 200-1 is aligned with the bottom aperture 412-1. Similarly, the lock 190-2 is provided such that a shaft 450-2 attached to or integral with the coupler 200-2 is aligned with the bottom aperture 412-2. Optionally, as shown in FIG. 4, a portion of the shafts 450-1, 450-2 may extend part-way or fully through the bottom apertures 412-1, 412-2, respectively, in order to minimize the height of the locks 190-1, 190-2.

The method 432 may further include coupling the interlock rod 250-1 with the first and second locks 190-1, 190-2 (FIG. 25—step A6). The interlock rod 250-1 may be coupled to the first lock 190-1 using the coupler arm 270-1, the L-shaped insert 379-1, and the lateral fastener 392-1, as shown in FIG. 10 and perhaps better seen with respect to the lock 190-4 in FIG. 13. Then, the outer end 280-1 of the coupler arm 270-1 may be inserted into the recess 310-1 such that the outer end 280-1 is rotatable with respect to the recess 310-1. Further, the inner portion 290-1 of the coupler arm 270-1 is mated to the interlock rod 250-1 using the L-shaped insert 379-1. The interlock rod 250-1 is inserted into the recess 360-1 such that the curved surface 373-1 of the interlock rod 250-1 is adjacent to the curved surface 365-1 of the coupler arm 270-1. Also, the first portion 382-1 of the L-shaped insert 379-1 is inserted into the recess 360-1 such that the bottom surface of the L-shaped insert 379-1 is adjacent the flat surface 376-1 of the interlock rod 250-1. Moreover, the lateral fastener 392-1 is inserted into an aperture in the second portion 384-1 of the L-shaped insert 379 and into the lateral aperture 362-4 of the coupler arm 270-1 such that the interlock rod 250-1 is secured to the coupler arm 270-1. This securement is such that rotation of the coupler arm 270-1 causes rotation of the interlock rod 250-1 and vice versa. In the same manner as with respect to the first lock 190-1, the interlock rod 250-1 may be coupled to the second lock 190-2.

The method 432 may further include securing the covers 425-1, 425-2 onto the assembly base 400-1 (FIG. 25—step A7). It should be noted here that the assembly base 400-1 includes a wear pad 455-1 disposed on a bottom surface of the assembly base 400-1 and proximal the first lock 190-1. The assembly base 400-1 further includes a wear pad 455-2 disposed on a bottom surface of the assembly base 400-1 and proximal the second lock 190-2, as shown in FIG. 9. A securement block 460-2 may be disposed on the wear pad 455-2. The base portion 300-2 of the coupler arm 270-2 may be disposed above wear pad 455-2 and in contact with the wear pad 455-2, as shown in FIG. 14 with respect to the fourth lock 190-4. The wear pad 455-4 may be made of a plastic or rubber-like material and may prevent potentially damaging metal to metal contact between the base portion 300-4 and the assembly base 400-2. Referring again to FIG. 9, it should be further noted that the securement block 460-2 includes two vertical holes—an inner hole 465-3 and an outer hole 465-4. Before the cover 425-2 is installed, an inner bolt 470-2 may be inserted into an inner aperture 475-3 of the lock 190-2 and into the inner hole 465-3 of the securement block. Thus, the lock 190-2 becomes secured to the base 400-2. Then, the cover 425-2 is installed atop the starboard side of the assembly base 400-1. Then, the outer bolt 430-2 is inserted into an aperture of the cover 425-2 and extends through an outer aperture 475-4 of the lock 190-2 and extends into the outer hole 465-4 of the securement block. Thus, the cover 425-2, the lock 190-2, and the assembly base 400-1 are secured to one another.

The method 432 may further include providing the rear lock assembly 170 atop the rear cross member 140 (FIG. 25—step A8).

Finally, the method 432 may include providing the first and second supplemental members 180-1, 180-2 atop the first and second longitudinal members 130-1, 130-2, respectively (FIG. 25—step A9). The supplemental members 180-1, 180-2 may be secured to the longitudinal members 130-1, 130-2. Alternatively, the supplemental members 180-1, 180-2 may be produced integrally with the longitudinal members 130-1, 130-2 during production of the chassis 110.

The steps of the method 432 and/or the steps within steps A1-A9 may be performed in any manner that is convenient or efficient. Moreover, one or more of steps A1-A9 and/or the steps within steps A1-A9 may be performed simultaneously. For example, the rear assembly 170 may be provided before the front assembly 160, or alternatively, the assemblies 160 and 170 may be provided simultaneously. As another example, the steps may be performed in the following order: A1, A9, A8, A2, A3, A4, A5, A6, A7.

Figure 16:
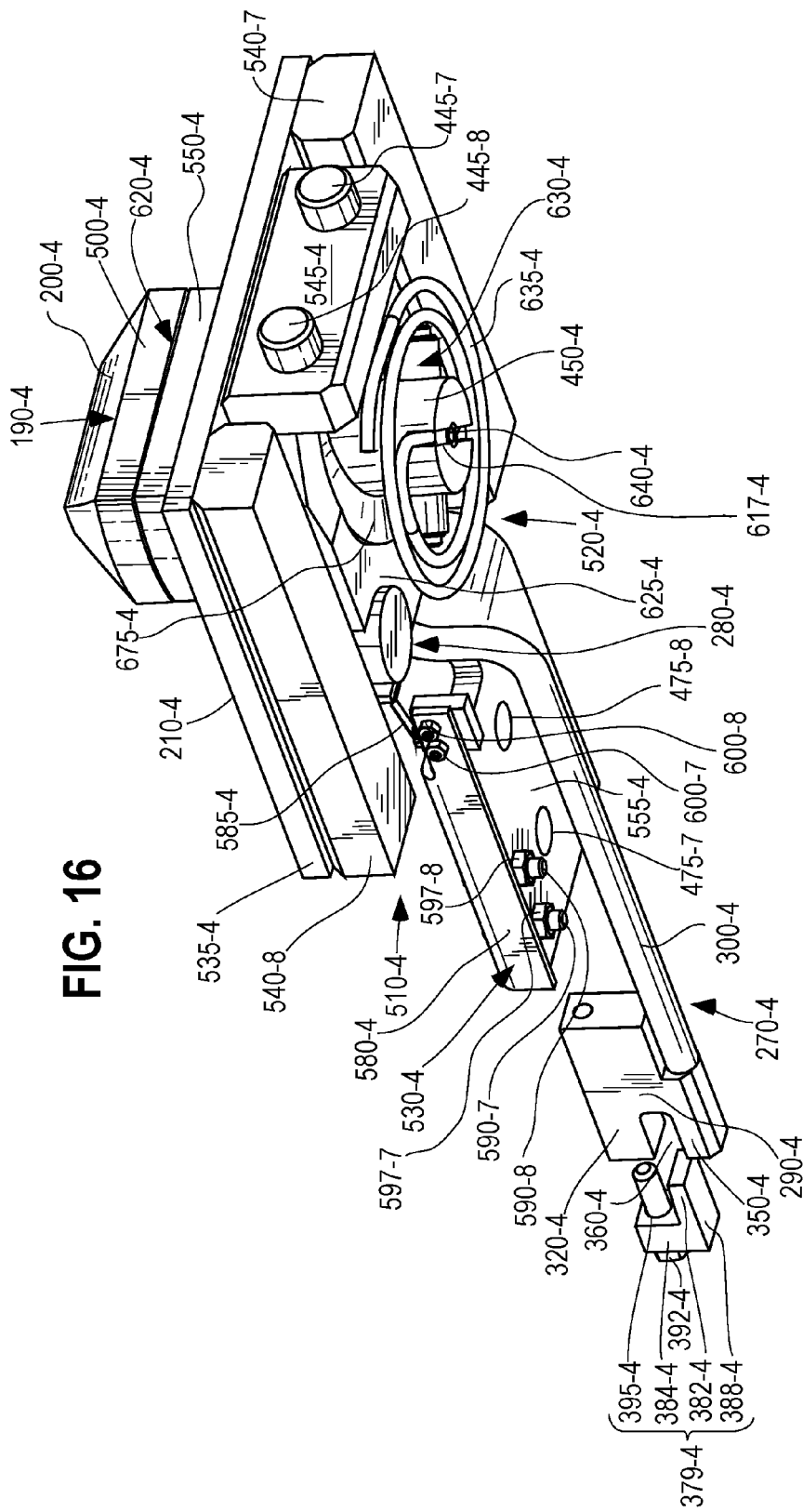
FIG. 16 is a bottom isometric view of a lock and a portion of an interlock assembly in partially exploded view.

Referring now to FIG. 16, which illustrates the lock 190-4. The lock 190-4 includes the coupler 200-4 (which includes a head 500-4 and the shaft 450-4), a lock platform 510-4 disposed below the head 500-4, a linkage mechanism 520-4 disposed partially below the lock platform 510-4, and a bracket assembly 530-4. As may be obvious, a portion of the coupler 200-4 (e.g., the head 500-4) is disposed above the lock platform 510-4. The lock platform 510-4 includes an upper plate 535-4, a support member 540-7 disposed below the upper plate 535-4 and proximal the front side of the upper plate 535-4, a support member 540-8 disposed below the upper plate 535-4 and proximal the rear side of the upper plate 535-4, and a pin plate 545-4 disposed below the upper plate 535-4 and proximal the outer side of the upper plate 535-4. As shown in FIG. 14, in an assembled state, the support member 540-7 is disposed in the slot 420-7 and support member 540-8 is disposed in the slot 420-8. Such a positioning of the support members 540-7, 540-8 may assist the lock 190-4 in bearing the stress imposed by the container 100 when the container 100 moves laterally (e.g., from side to side or from front to back).

Figure 17:
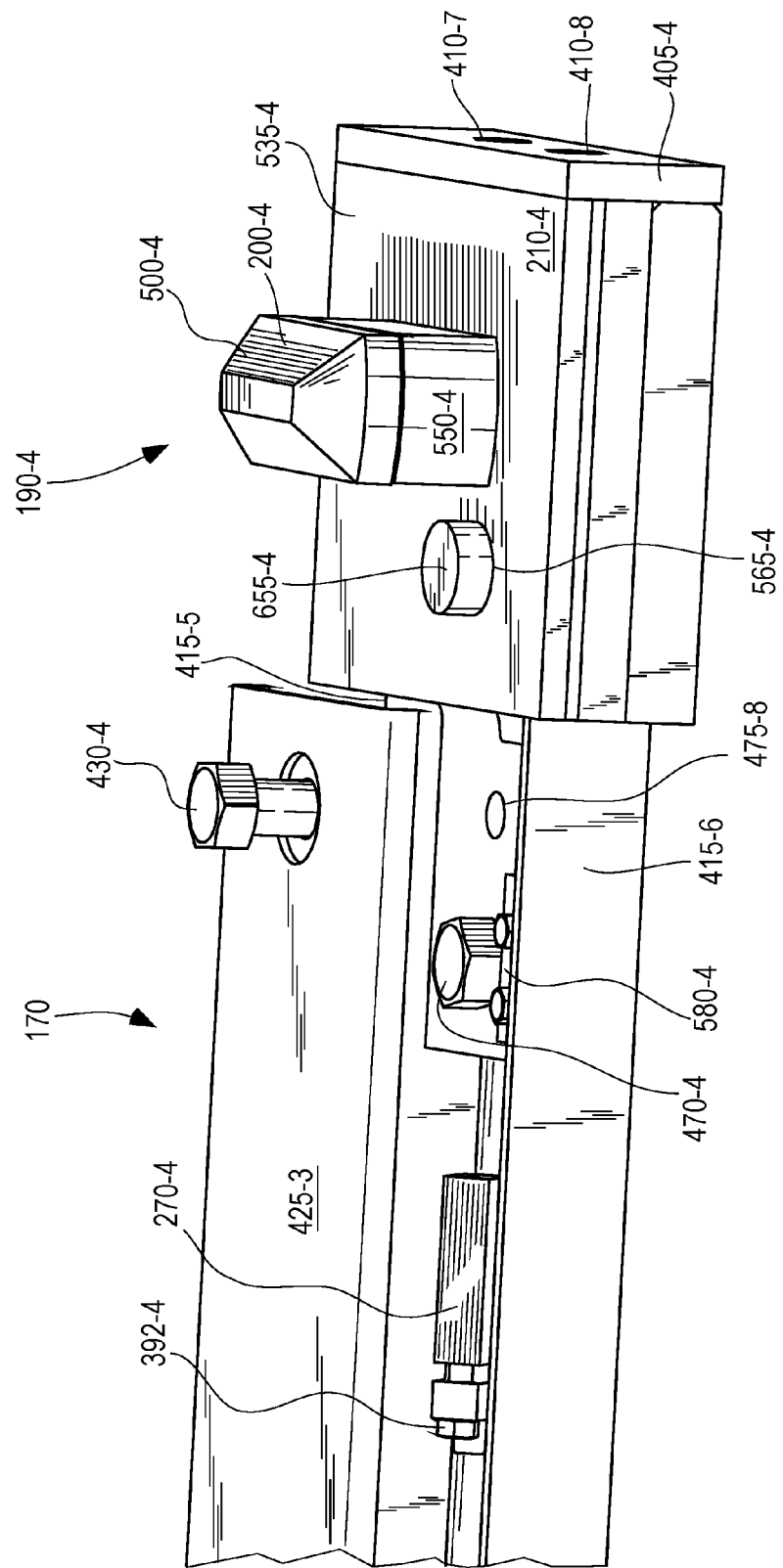
FIG. 17 is a partially exploded top isometric view of the lock and a portion of the interlock assembly.
Figure 21:
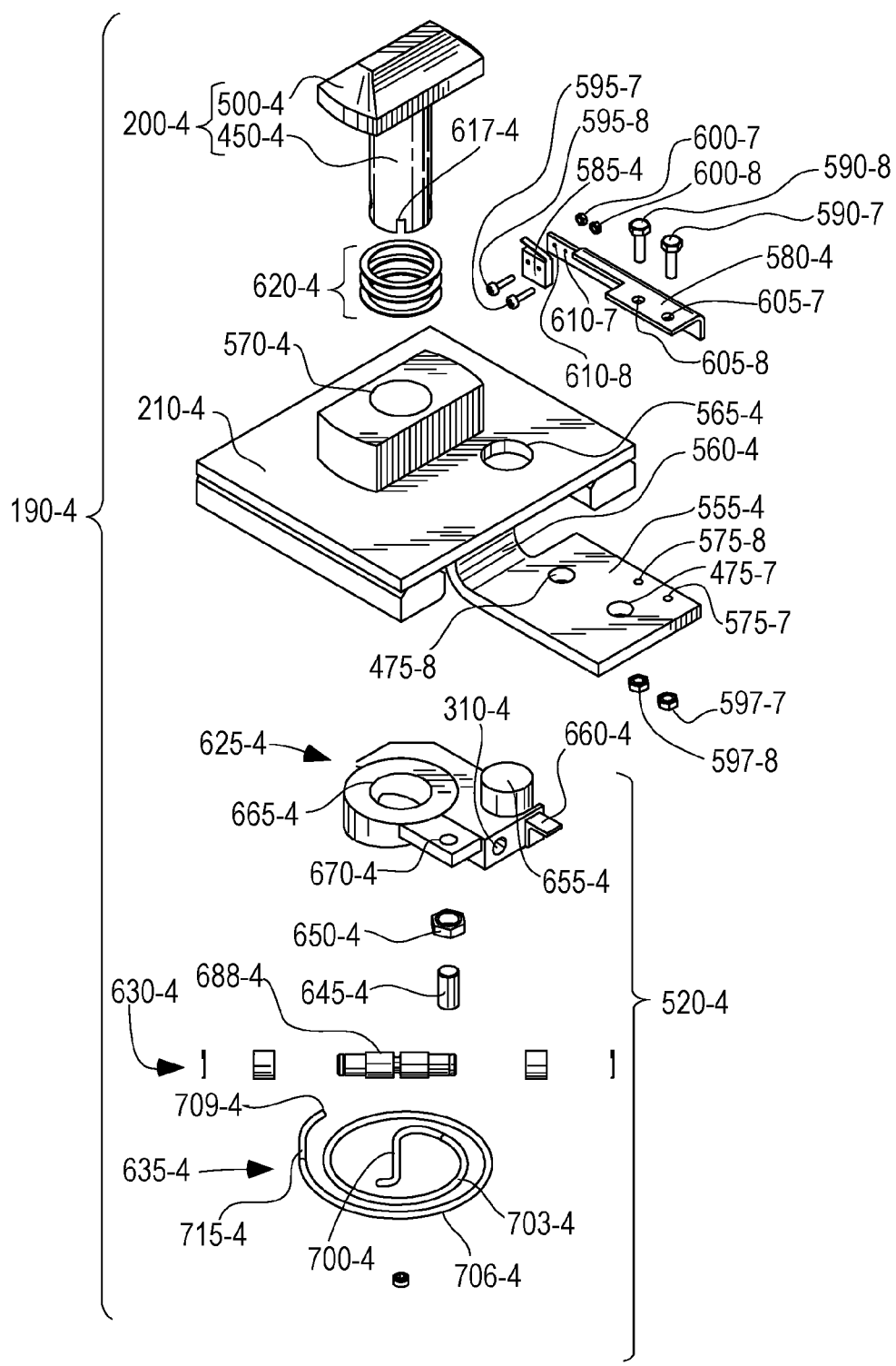
FIG. 21 is an exploded top isometric view of the lock.

As shown in FIG. 17, the lock platform 510-4 further includes a raised platform 550-4 extending upward from the upper plate 535-4. Moreover, the lock platform 510-4 includes a protruding plate 555-4 extending from an inner side of the upper plate 535-4, as shown in FIG. 21. The protruding plate 555-4 is disposed lower than the upper plate 535-4 and is attached thereto by a curved portion 560-4 integral with the protruding plate 555-4.

Still referring to FIG. 21, the lock platform 510-4 includes an actuation aperture 565-4 in the upper plate 535-4 and a shaft aperture 570-4 in the raised platform 550-4. Both the actuation aperture 565-4 and the shaft aperture 570-4 may be oriented vertically, meaning they are adapted to receive a vertical shaft or cylinder. Moreover, the protruding plate 555-4 includes the inner aperture 475-7 and the outer aperture 475-8, both oriented vertically. The protruding plate 555-4 further includes bracket apertures 575-7 and 575-8 disposed proximal the rear side of the protruding plate 555-4.

Still referring to FIG. 21, the bracket assembly 530-4 includes a bracket 580-4, a limit switch 585-4, inner and outer vertical fasteners 590-7, 590-8, inner and outer lateral fasteners 595-7, 595-8, inner and outer nuts 597-7, 597-8 associated with the vertical fasteners 590-7, 590-8, respectively, and inner and outer nuts 600-7, 600-8 associated with the inner and outer lateral fasteners 595-7, 595-8, respectively. The bracket 580-4 preferably has an L-shape comprising two surfaces integral with one another and normal to one another. As further shown in FIG. 21, the bracket 580-4 includes two vertical apertures 605-7, 605-8 adapted to receive the vertical fasteners 590-7, 590-8, respectively. The bracket further includes two horizontal apertures 610-7, 610-8 adapted to receive the lateral fasteners 595-7, 595-8, respectively. As shown in FIG. 14, the vertical fasteners 590-7, 590-8 extend through the two vertical apertures 605-7, 605-8, respectively. Further, the vertical fasteners 590-7, 590-8 extend through the bracket apertures 575-7, 575-8, respectively. Thus, the vertical fasteners 590-7, 590-8 secure the bracket 580-4 to the protruding plate 555-4, as shown in FIG. 19.

Figure 22:
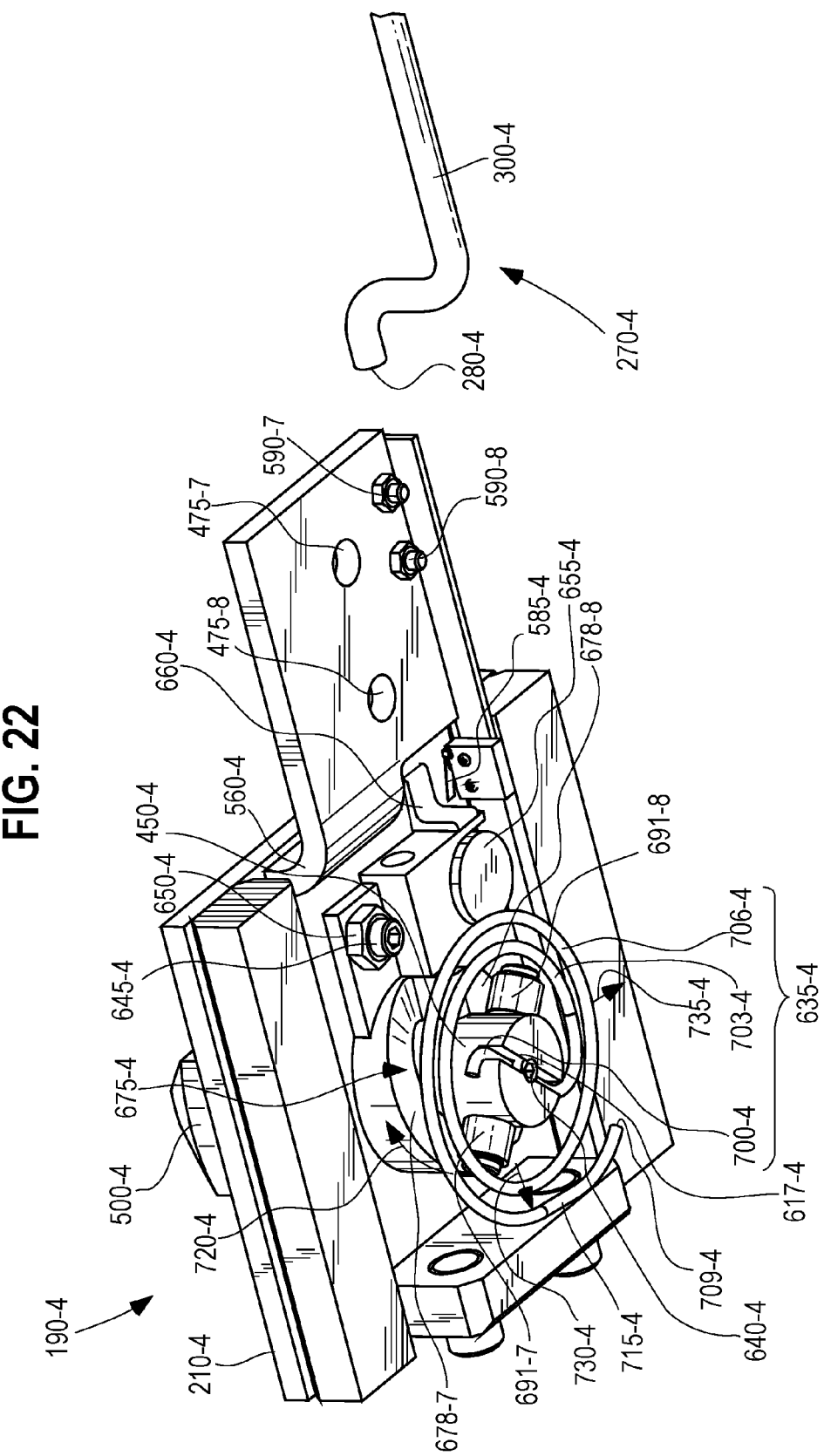
FIG. 22 is a bottom isometric view of the lock with the interlock assembly in partially exploded view.
Figure 23:
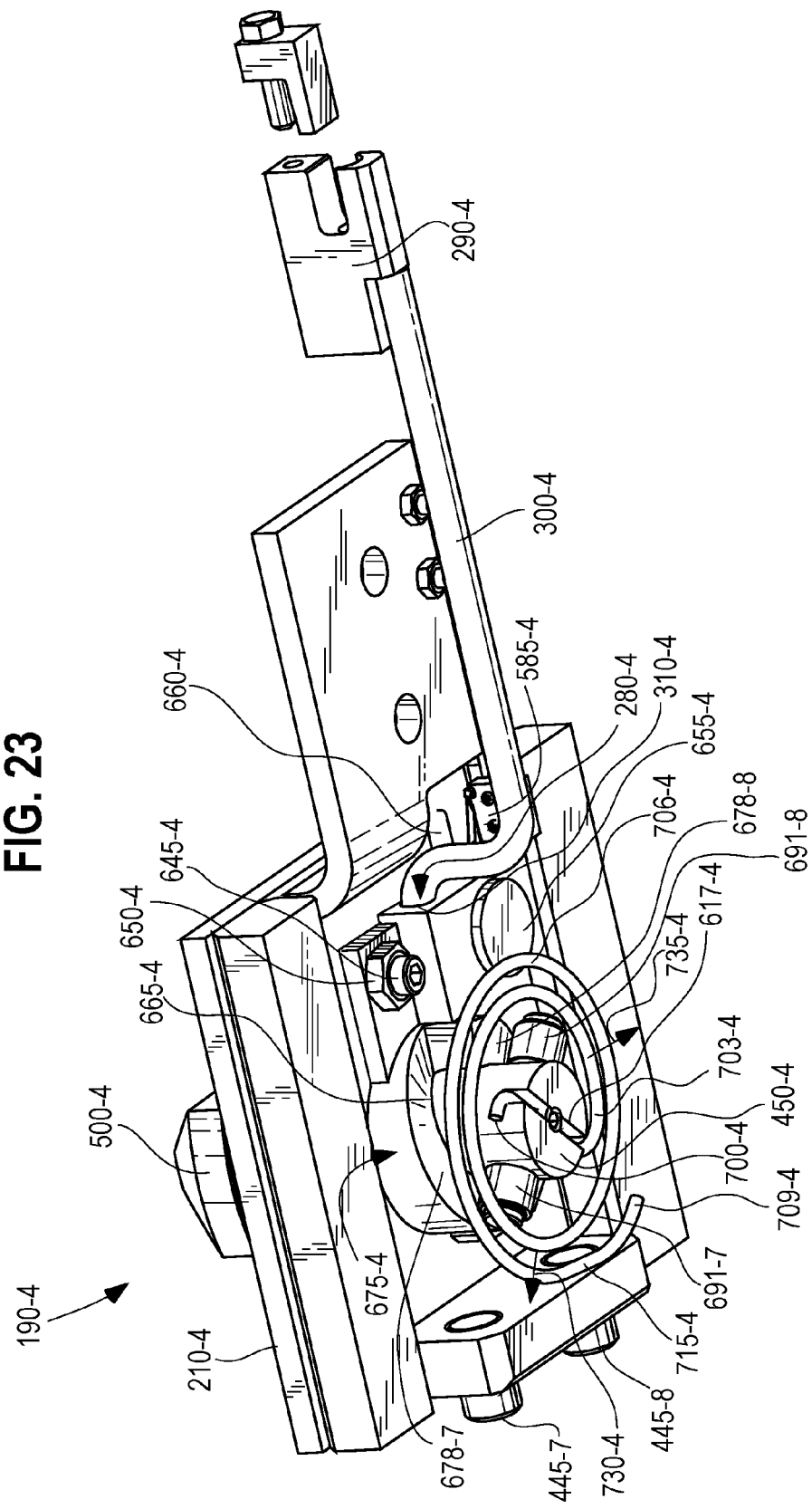
FIG. 23 is a bottom isometric view of the lock with a coupler arm of the interlock assembly coupled to the lock, with the interlock assembly in partially exploded view.

The limit switch 585-4 is secured to the bracket 580-4 using the two lateral fasteners 595-7, 595-8, shown in FIG. 21. In particular, the two lateral fasteners 595-7, 595-8 extend through apertures in the limit switch 585-4 and through the horizontal apertures 610-7, 610-8, and are secured to the bracket 580-4 by inner and outer nuts 600-7, 600-8. As shown in FIG. 22, the limit switch 585-4 is attached to a hanging portion of the bracket 580-4 that extends toward the linkage mechanism 520-4. The limit switch 585-4 is disposed such that it is actuated when the linkage mechanism 520-4 moves sufficiently downward. The limit switch 585-4 may be in communication with a display device or a server. The actuation of the limit switch 585-4 may cause a signal to be communicated to a display visible to a semi-truck driver the signal indicating that the corner casting 230-4 is secured to the chassis 110. Additionally, or alternatively, the actuation of the limit switch 585-4 may cause a signal to be communicated to a display visible to a port manager, a port security manager, or other personnel in charge of monitoring one or more stages of intermodal transportation. Additionally, or alternatively, the actuation signal may be communicated to a software or firmware program for monitoring placement and movement of containers 100. Optionally, the program may provide an alert to a display device visible to one or more personnel if there has been an unauthorized movement of the container 100. Optionally, the limit switch 585-4 may be positioned relative to the lock 190-4 using other means than the bracket assembly 530-4, such as the limit switch 585-4 being attached to the assembly base 400-2 and/or the lock platform 510-4.

Figure 18:
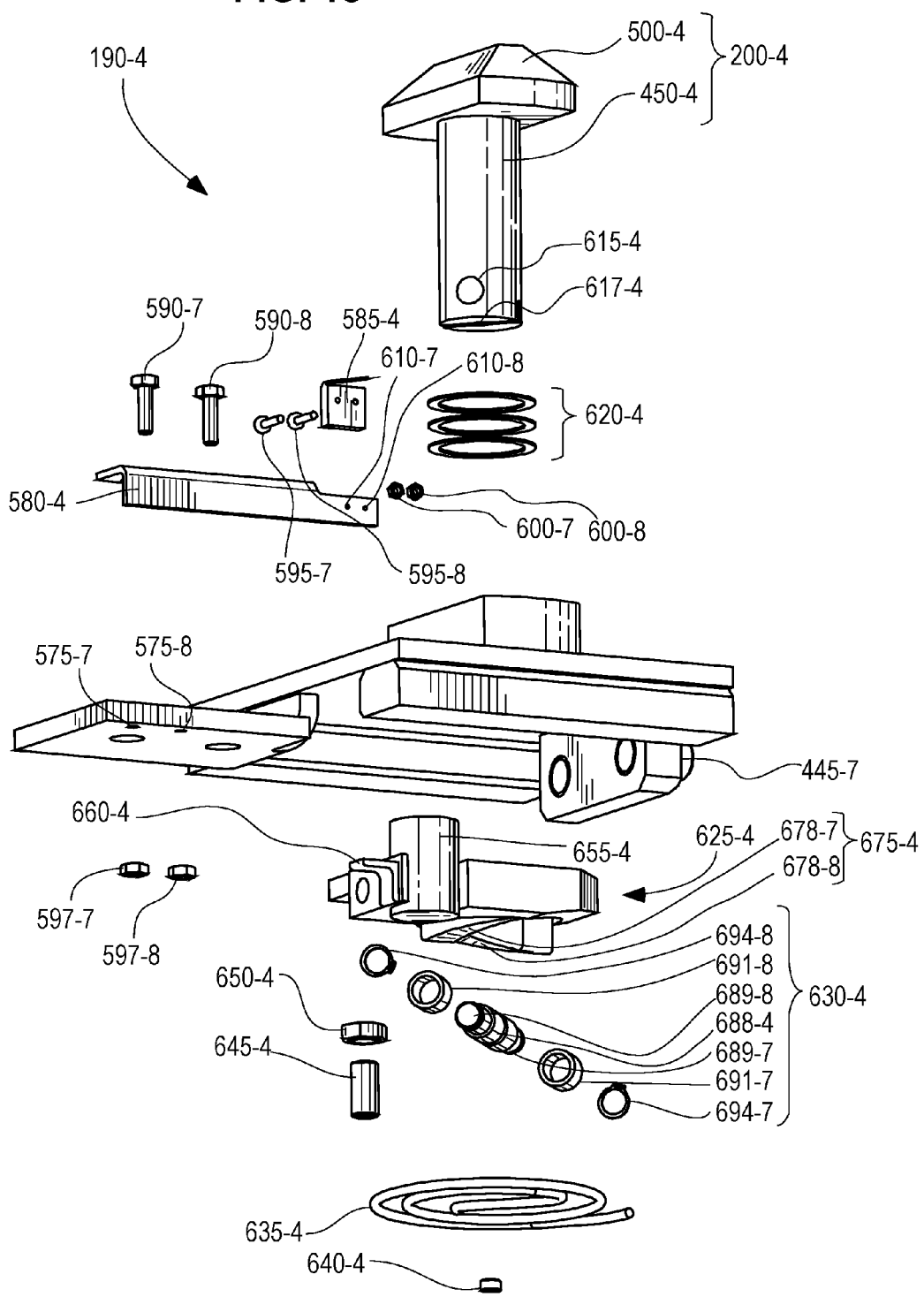
FIG. 18 is an exploded bottom isometric view of the lock.
Figure 19:
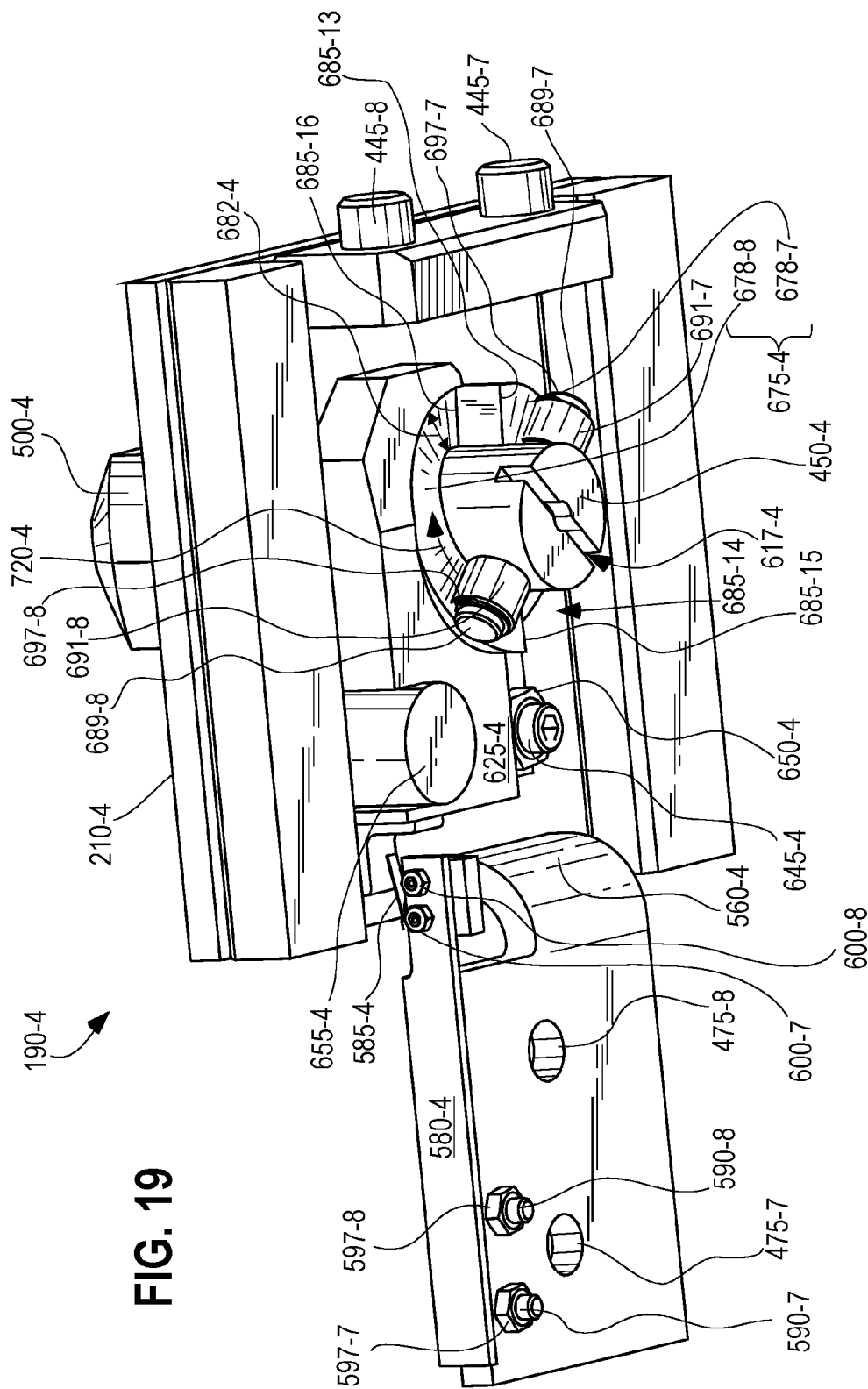
FIG. 19 is a bottom isometric view of the linkage mechanism, with some components not shown.
Figure 20:
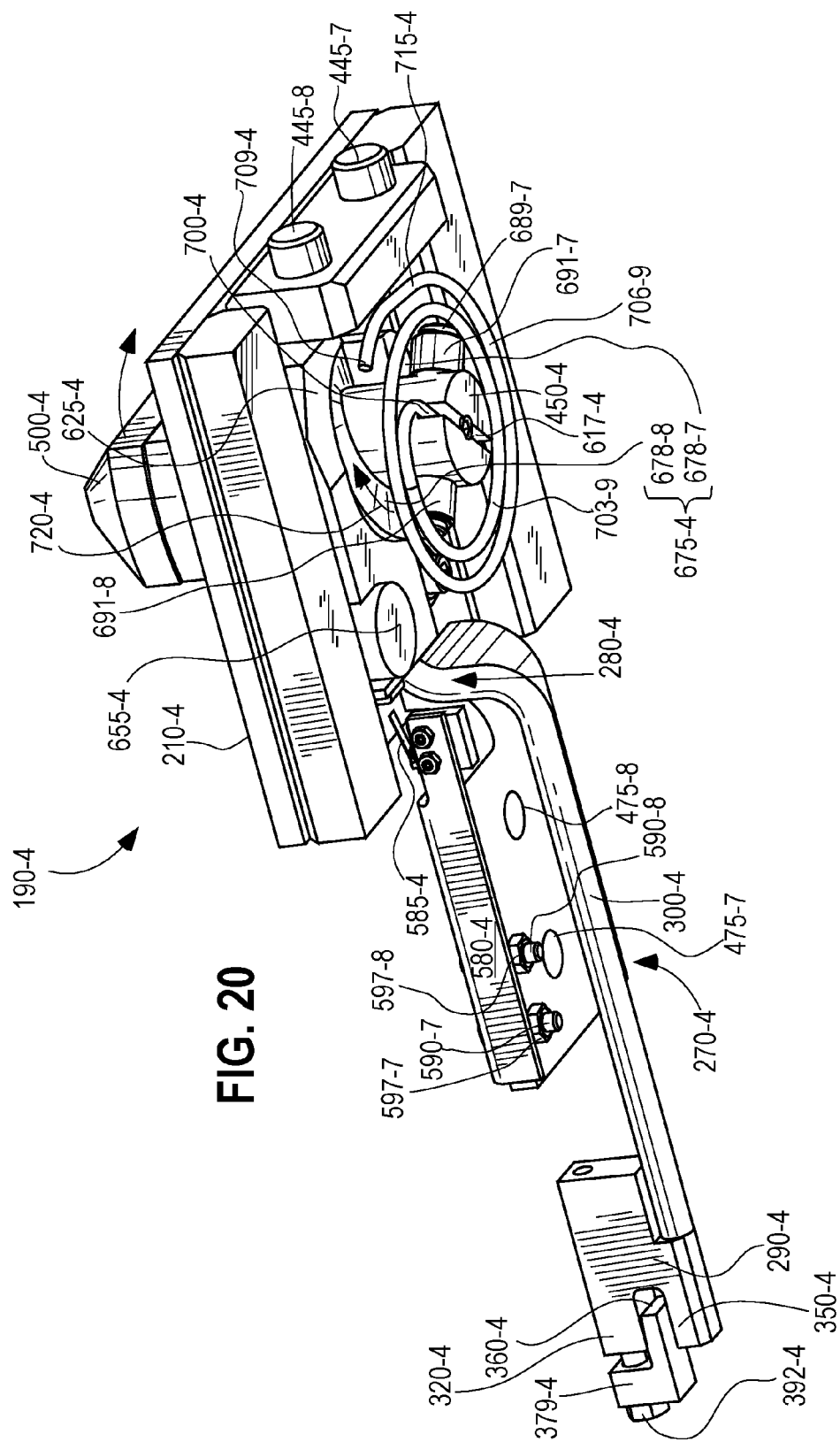
FIG. 20 is a bottom isometric view of the linkage mechanism with the interlock assembly in partially exploded view.

Referring now to FIG. 19, the shaft 450-4 extends through the shaft aperture 570-4. As further shown in FIG. 18, the shaft 450-4 includes a lateral hole 615-4 extending diametrically through the shaft 450-4, preferably proximal the bottom of the shaft 450-4. In addition, as further shown in FIG. 19, the shaft 450-4 includes a lateral groove 617-4 along a bottom surface of the shaft 450-4, the lateral groove 617-4 preferably having an orientation roughly normal to the lateral hole 615-4. As further shown in FIG. 21, the lock 190-4 includes one or more shims 620-4 (e.g., three shims 620-4, as shown). As shown in FIG. 16, the shims 620-4 surround the shaft 450-4 of the coupler 200-4 and are disposed between the head 500-4 and the raised platform 550-4. The shaft 450-4 is operably coupled to the linkage mechanism 520-4, as shown in FIG. 16.

Referring now to FIG. 18, the linkage mechanism 520-4 includes a linkage core 625-4, a spindle assembly 630-4, a spiral spring 635-4, a spring fastener 640-4, a set screw 645-4, and a nut 650-4 associated with the set screw. The linkage core 625-4 includes an actuation device 655-4 having a cylindrical shape that extends through the actuation aperture 565-4 such that a portion of the actuation device 655-4 is disposed higher than the upper surface 210-4 of the upper plate 535-4, as shown in FIG. 17. Referring again to FIG. 18, the linkage core 625-4 includes a switch actuator 660-4 extending laterally outward and disposed above the limit switch 585-4, as shown in FIG. 22. As shown in FIG. 21, the linkage core 625-4 further includes a vertical shaft aperture 665-4 disposed under and aligned with the shaft aperture 570-4 of the raised platform. The linkage core 625-4 further includes the recess 310-4 that receives the coupler arm 270-4 of the interlock assembly 240-2. Moreover, the linkage core 625-4 includes a vertical setting aperture or recess 670-4 that receives the set screw 645-4 in order to set-up a vertical position of the linkage core 625-4 in relation to the upper plate 535-4. The set screw 645-4 is disposed vertically and secured to the linkage core 625 by the nut 650-4, as shown in FIG. 22, such that, in an unactuated state, the linkage core 625 does not rise above a certain predetermined position that corresponds to the extent to which the set screw 645-4 is inserted into the linkage core 625-4.

A bottom surface of the linkage core 625-4 includes an actuation surface 675-4 (for example, a helical actuation surface 675-4) that surrounds the shaft aperture 665-4, as shown in FIG. 19. The actuation surface 675-4 is at least one of curved and sloped. In this example, the actuation surface 675-4 includes first and second sloped surfaces 678-7, 678-8. First sloped surface 678-7 surrounds roughly half of the circumference of the shaft 450-4 whereas the second sloped surface 678-8 surrounds roughly the other half of the circumference, in this example. Thus, the actuation surface 675-4 is disposed substantially circumferentially about the shaft 450-4. First and second sloped surfaces 678-7, 678-8 may each have at least a partial helical shape and may be disposed opposite one another. Because the shaft 450-4 has a cylindrical shape, the second sloped surface 678-8 has a hollow semi-circular shape when viewed from below in FIG. 19. The semi-circular shape may have a width 682-8. The second sloped surface 678-8 has a ramp-like shape when viewed from the side (see FIG. 18). The ramp-like shape may include a consistent slope and/or a curve. Thus, the second sloped surface 678-8 may form a track having a first end 685-15 disposed at a lower level than a second end 685-16, as shown in FIG. 19. Similarly, the first sloped surface 678-7 may form a track having a first end 685-13 disposed at a lower level than a second end 685-14.

Optionally, the linkage core 625-4 may be comprised of components that are welded together. Additionally, or alternatively, the linkage core 625-4 may include ductile iron or another similar metal.

Referring now to FIG. 18, the spindle assembly 630-4 includes a spindle 688-4 having a roughly cylindrical shape having two outer ends 689-7, 689-8, two spindle rollers 691-7, 691-8 having a roughly annular shape, and rings 694-7, 694-8. As further shown in FIG. 19, the spindle 688-4 extends through the lateral hole 615-4 such that end 689-7 of the spindle 688-4 extends out of one side of the shaft 450-4 and the end 689-8 of the spindle 688-4 extends out of the opposite side of the shaft 450-4. The spindle 688-4 is an example of an interaction member associated with the coupler 210-4. Interaction between the coupler 210-4 and the actuation surface 675-4 may be facilitated by another type of interaction member. As further shown, the roller 691-7 surrounds the end 689-7 and the roller 691-8 surrounds the end 689-8. The ring 694-7 includes the stub 697-7 and surrounds the end 689-7. Further, the ring 694-8 includes the stub 697-8 and surrounds the end 689-8.

A surface of the roller 691-7 is in contact with the first sloped surface 678-7 and a surface of the roller 691-8 is in contact with the second sloped surface 678-8. Thus, as the shaft 450-4 rotates, the spindle 688-4 rotates about the vertical axis of the shaft 450-4. In addition, the spindle 688-4 rotates about a rotating lateral axis of the lateral hole 615-4 such that the rollers 691-7, 691-8 rotate about the rotating lateral axis. In turn, the roller 691-7 moves along the first sloped surface 678-7 toward the higher end 685-14 during actuation. The movement of the roller 691-7 along the first sloped surface 678-7 may be limited, in part, by the stub 697-7. Similarly, the roller 691-8 moves along the second sloped surface 678-8 toward the higher end 685-16. The movement of the roller 691-8 along the second sloped surface may be limited, in part, by the stub 697-8.

Referring again to FIG. 22, the spiral spring 635-4 comprises an inner portion 700-4 having approximately an L-shape, an inner loop 703-7 attached to the inner portion 700-4, and an outer loop 706-4 having an outer end 709-4. It should be noted that the spring 635-4 is disposed lower than the actuation surface 675-4. The outer end 709-4 of the outer loop 706-4 is the outermost end of the spring 635-4. The spring 635-4 is substantially flat, meaning that the inner portion 700-4, the inner loop 703-4, and the outer loop 706-4 occupy roughly the same horizontal plane. As further shown, the spiral spring 635 may be disposed in the groove 617-4 such that the L-shaped inner portion 700-4 is inside the groove 617-4. The spring 635-4 is secured to the groove 617-4 by the fastener 640-4 that is disposed in the groove below the L-shaped inner portion 700-4. The inner portion 700-4 of the spring 635-4 may be secured to the shaft 450-4 in another way or may be integral with the shaft 450-4. It should be noted here that the outer loop 706-4 is partially straightened (with respect to the curvature of the spiral spring 635-4 as a whole) at a straight portion 715-4. The straight portion 715-4 may be disposed against an inner surface of the pin plate 545-4 such that the straight portion 715-4 is captured in position (i.e., secured to the lock platform 510-4) because of tension between the straight portion 715-4 and the pin plate 545-4. Optionally, the diameter of the wire of the spring 635-4 may be smaller than shown.

The actuation of the linkage mechanism 620-4 is as follows.

As the container 100 is lowered onto the chassis 110 having the locking system 150, the corner casting 230-4 of the container 100 is lowered onto the lock 190-4. It should be noted here that the corner casting 230-4 has a bottom hole 220-4 oblong in shape and extending through the bottom surface of the corner casting 230-4, as shown in FIG. 5. As the container 100 is lowered, the head 500-4 and the raised platform 550-4, shown in FIG. 17, begin to extend through the hole 220-4. Once the bottom side of the corner casting 230-4 is completely below the head 500-4, the corner casting 230-4 depresses the actuation device 655-4. The depression of the actuation device 655-4 causes a downward movement of the linkage core 625-4, shown in FIG. 18. Downward movement of the linkage core 625-4 includes the actuation surface 675-4 moving lower. The downward movement of the actuation surface 675-4 applies a downward force on the rollers 691-7, 691-8, shown in FIG. 19. The downward force on the rollers 691-7, 691-8 causes a downward force on the shaft 450-4 of the coupler 200-4. But, there is little or no space for the coupler 200-4 to actually move downwards, as shown in FIG. 17. This is because the head 500-4 of the coupler 200-4 is already abutting the shims 620-4, which are already abutting the raised platform 550-4. Therefore, the downward movement of the actuation surface 675-4 causes the roller 691-7 to roll on the first sloped surface 678-7 toward the higher end 685-14. Similarly, the downward movement of the linkage core 625-4 causes the roller 691-8 to roll on the second sloped surface 678-8, in the direction denoted by reference number 720-4, toward the higher end 685-16, as shown in FIG. 19.

Figure 7:
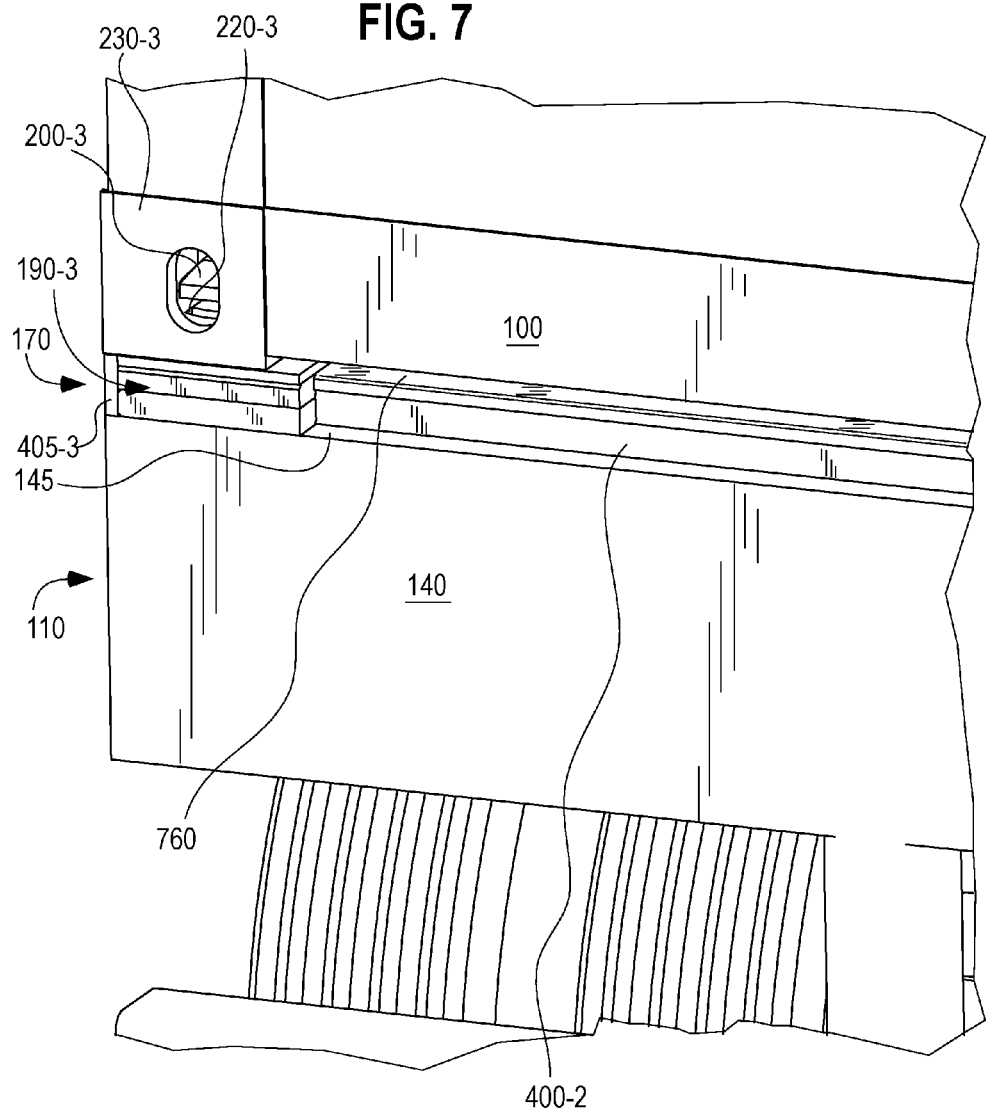
FIG. 7 is a top isometric view of a portion the rear lock assembly, with a container disposed on the chassis.

Such movement of the rollers 691-7, 691-8 causes the spindle 688-4 to rotate about a longitudinal axis of the shaft 450-4, thereby causing the shaft 450-4 to rotate about the longitudinal axis of the shaft 450-4. Rotation of the shaft 450-4 causes rotation of the head 500-4. As the container 100 is lowered further, the actuation device 655-4 is depressed further and the shaft 450-4 and the head 500-4 are further rotated. This rotation continues until the corner casting 230-4 comes into contact with the top surface 210-4 of the upper plate 535-4. At this point, the head 500-4 has been rotated 90 degrees such that the corner casting 230-4 is secured to the lock 190-4 because the oblong hole 220-4 cannot move upwards around a rotated head 500-4, as shown in FIG. 5, which illustrates a rotated head 500-1 in an actuated or fully rotated position with respect to the first lock 190-1. Optionally, the rotation of the head 500-4 may be greater than or lesser than 90 degrees. Similarly, in FIG. 7, the head 500-3 is shown in an actuated or fully rotated position with respect to the third lock 190-3. Moreover, during actuation, the downward movement of the linkage core 625-4 includes downward movement of the recess 310-4, shown in FIG. 13, thus actuating the interlock assembly 240-4 as described above in detail. Moreover, at some point during actuation (the point is determined based on the position of the limit-switch 585-4 in relation to the switch actuator 660-4), the depression of the actuation device 655-4 causes the switch actuator 660-4 to actuate the limit switch 585-4.

Thus, movement of the actuation device 655-4 causes movement of the interaction member (e.g., the spindle 688-4) along the actuation surface 675-4 in a direction 720-4 such that the coupler 210-4 automatically secures the container 100 to the lock 190-4.

It should be noted that the spring 635-4 biases the interaction member (e.g., the spindle 688-4) against movement in the direction 720-4. It should be further noted that during actuation, rotation of the shaft 450-4 causes rotation of the L-shaped inner portion 700-4 of the spiral spring 635-4, shown in FIG. 22. Because the straightened portion 715-4 is captured by the pin plate 545-4, rotation of the inner portion 700-4 causes the inner loop 703-4 to move outwardly in a direction approximated by the arrow 730-4 of FIG. 22. Rotation of the inner portion 700-4 also causes the a part of the outer loop 706-4 to move outwardly in a direction approximated by the arrow 735-4 of FIG. 22. These movements of the spiral spring 635-4 load the spring such that the spring 635-4 is able to unload in order to motivate un-actuation of the lock 190-4.

When the chassis 110 having the locking system 150 is in an actuated state, the container 100 is disposed parallel to the ground, as shown in FIG. 1. The weight of the rear of the container 100 is borne by the rear lock assembly 170 because of the corner castings 230-3, 230-4 resting upon the rear lock assembly 170. In contrast, most of the weight of the front of the container 100 is borne by the supplemental members 180-1, 180-2 because the bottom of the container 100 is resting upon the supplemental members 180-1, 180-2. As further shown, there is a gap 760 between the bottom surface of the container 100 and the longitudinal members 130-1, 130-2, except at the gooseneck portion of the chassis 110 (the raised portions 147-1, 147-2). The low-profile nature of the front and rear lock assemblies 160, 170 minimizes the extent of the gap 760. In other words, the container 100 is kept close to the chassis 110 because the locks 190 have a small height (the small height is as a result of the design of the linkage mechanism 520-4 and other components of the interlock system 150). The height of the locks 190 is approximately 2¼ inches (6.35 cm) in the illustrated embodiment. Accordingly, the height of the front and rear lock assemblies 160, 170 and the supplemental members 180-1, 180-2 may also be approximately 2¼ inches (6.35 cm). Keeping the container 100 closer to the chassis 110 may provide for better securement of the container 100.

It should be noted here that lateral or horizontal loads imposed on the locks 190 because of lateral movement (front to back or side to side) of the container 100 may be borne partially by the pins 445 of the pin plate 545 or other components of the lock platform 510 that are mated to the assembly base 400.

It should also be noted here that the interlock rod 250-2 described above has properties that allow for uneven loading of the container 100 onto the chassis 110. For example, assume that the container 100 is loaded such that the corner casting 230-4 is loaded onto the lock 190-4 before the corner casting 230-3 is loaded onto the lock 190-3. Assume further that the corner casting 230-4 has fully actuated the lock 190-4 while the head 500-3 of the lock 190-3 still has not cleared the bottom hole 220-3 of the corner casting 230-3. In such a situation, the actuation of the lock 190-4 results in a rotational force being applied to the interlock rod 250-2. But, the interlock rod 250-2 cannot rotate proximal the lock 190-3 because the head 500-3 cannot rotate while it is still within the hole 220-3. As a result, the interlock rod 250-2 twists or experiences torsion (the interlock rod 250-2 may be made of a material that tolerates such torsion without permanently deforming). As the corner casting 230-3 is lowered further, the head 500-3 clears the hole 220-3 and rotates, thereby allowing the interlock rod 250-2 to rotate proximal the lock 190-3, thereby relieving the torsion in the interlock rod 250-2. In this way, the interlock rod 250-2 behaves in a spring-like manner to allow for uneven loading of the container 100 onto the chassis 110 having the locking system 150.

Un-actuation of the lock 190-4 is as follows.

As the container 100 is lifted upward from the chassis 110 having the locking system 150, the corner casting 230-4 of the container 100 is lifted upward from the lock 190-4. As the container 100 is lifted, the spiral spring 635-4 begins to unload and thereby applies a force on the shaft 450-4 to rotate in a direction opposite to the direction during actuation. As the spring 635-4 unloads, the components of the spring 635-4 tend to return to their pre-actuation position, shown in FIG. 22. Such rotation of the shaft 450-4 causes the roller 691-7 to roll toward the lower end 685-13 of the first sloped surface 678-7 and causes the roller 691-8 to roll toward the lower end 685-15 of the second sloped surface 678-8. It should be noted that because the straightened portion 715-4 is fixed, or at least largely immobile with respect to the pin plate 545-4, the spring 635-4 ensures that the level of the bottom surface of the shaft 450-4 remains fixed in the vertical direction during actuation and un-actuation, or remains at least substantially level in the vertical direction. Because the shaft 450-4 cannot move upward, the movement of the rollers 691-7, 691-8 applies an upward force on the helical actuation surface 675-4, thereby causing upward movement of the linkage core 625-4.

The linkage core 625-4 can move upward because the actuation device 655-4 can move upward as the container 100 is lifted off the lock 190-4. It should be noted that such upward movement of the linkage core 625-4 causes the interlock rod 250-2 to rotate in a direction opposite the direction during actuation. It should also be noted that such upward movement of the linkage core 625-4 causes the switch actuator 660-4 to be lifted from the limit switch 585-4, thereby un-actuating the limit switch 585-4.

Such upward movement of the linkage core 625-4 continues as the spring 635-4 unloads—until the set screw 645-4 prevents upward movement of the linkage core 625-4 beyond a selected level. The set screw 645-4 may have been pre-set to ensure that the linkage core 625-4 does not move above a certain level. The spring 635-4 may rotate the shaft 450-4 90 degrees during un-actuation before the linkage core 625-4 reaches this limit. When the linkage core 625-4 has reached this limit, the head 500-4 of the coupler 200-4 may be aligned with the raised portion 550-4, as shown in FIG. 17. As the container 100 is raised further, the bottom hole 220-4 of the corner casting 230-4 fits around the head 500-4 and around the raised portion 550-4. Thus, the corner casting 230-4 is lifted above the head 500-4 and the container 100 becomes unsecured from the lock 190-4.

INDUSTRIAL APPLICABILITY

In summary, a chassis that includes the locking system 150 can better secure a container to the chassis. In addition, such a chassis is easier to produce and/or assemble because the insides of the front and rear cross members of the chassis do not have to be modified, among other reasons. In addition, such a chassis is easier to produce from an existing chassis. Moreover, the linkage mechanism and the interlock assembly of the locking system 150 have a low-profile and perform better securement of the container to the chassis.

The locking system 150 can be used to secure a container 100 to other apparatus besides a trailer chassis connected to a semi-truck. The locking system 150 can be used to modify existing train trailers or during the production and/or assembly of new train trailers. The locking system 150 can be used to modify existing apparatus on a container ship or during the production and/or assembly of the apparatus of the container ship. The locking system 150 can also be used to modify existing cargo aircraft or during the production and/or assembly of new cargo aircraft or associated apparatus. In general, the compact and low-profile nature of the locking system 150 in conjunction with its ease of installation/production makes the locking system 150 an attractive option for the securement of various types of containers to various types of apparatus.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A locking system, comprising:
   a lock assembly comprising a first lock and a second lock disposed on opposite sides of the lock assembly;
   an interlock assembly coupled to the first and second locks, the interlock assembly comprising a rod and at least one coupler member coupled to the rod, the coupler member having an outer end disposed in a recess of a linkage mechanism of the first lock; and
   an actuation device coupled to the linkage mechanism wherein vertical depression of the actuation device automatically causes downward movement of the linkage mechanism and wherein downward movement of the linkage mechanism causes downward movement of the outer end.

2. The locking system of claim 1, wherein the outer end of the coupler member is rotatable within the recess of the linkage mechanism.

3. The locking system of claim 1, wherein a wear member is disposed below the coupler member.

4. The locking system of claim 1, wherein the coupler member is a first coupler member and the interlock assembly further comprises a second coupler member coupled to the rod and associated with the second lock, wherein downward movement of the outer end of the first coupler member causes a rotation of the rod that causes downward movement of an outer end of the second coupler member.

* * * * *